United States Patent
Laval et al.

(10) Patent No.: US 6,889,098 B1
(45) Date of Patent: *May 3, 2005

(54) METHOD AND APPARATUS FOR MANAGING ATTRACTION ADMISSION

(75) Inventors: Bruce G. Laval, Windermere, FL (US); Gregory B. Hale, Lake Buena Vista, FL (US)

(73) Assignee: Disney Enterprises, Inc., Burbank, CA (US)

( * ) Notice: Subject to any disclaimer, the term of this patent is extended or adjusted under 35 U.S.C. 154(b) by 534 days.

This patent is subject to a terminal disclaimer.

(21) Appl. No.: 09/617,721

(22) Filed: Jul. 17, 2000

Related U.S. Application Data

(63) Continuation-in-part of application No. 09/372,405, filed on Aug. 10, 1999, now Pat. No. 6,173,209.

(51) Int. Cl.[7] .............................................. G06B 19/00

(52) U.S. Cl. .................................. 700/19; 705/5; 705/6; 700/19; 700/20

(58) Field of Search .......................... 705/5, 6; 700/19, 700/20, 91

(56) References Cited

U.S. PATENT DOCUMENTS

| | | |
|---|---|---|
| 3,893,097 A | 7/1975 | Lach et al. |
| 3,998,570 A | 12/1976 | Jacobs |
| 4,081,669 A | 3/1978 | Klingman, III ........ 356/139.04 |
| 4,086,475 A | 4/1978 | Churchill |
| 4,095,739 A | 6/1978 | Fox et al. |
| 4,097,727 A | 6/1978 | Ulch |
| 4,247,759 A | 1/1981 | Yuris et al. |
| 4,298,793 A | 11/1981 | Melis et al. ................. 235/487 |
| 4,398,257 A | 8/1983 | Paganini et al. |
| 4,512,667 A | 4/1985 | Doulton et al. ............... 368/10 |
| 4,538,056 A | 8/1985 | Young et al. |

(Continued)

FOREIGN PATENT DOCUMENTS

| | | |
|---|---|---|
| DE | 1006392 A3 | 8/1994 |
| EP | 0086199 1 | 8/1987 |
| EP | 1076319 A1 | 2/2001 |

(Continued)

OTHER PUBLICATIONS

International Search Report of Jun. 23, 2003, Referencing 3 Items.

*Primary Examiner*—Anthony Knight
*Assistant Examiner*—Ronald D Hartman, Jr.
(74) *Attorney, Agent, or Firm*—Donald L. Wenskay, Esq.; Charles Berman, Esq.; Greenberg Traurig, LLP

(57) ABSTRACT

The invention is a method and system for managing admission to an attraction. In one or more embodiments, the system comprises a first queue by which customers may access the attraction by waiting in line and a second queue by which customers may access the attraction in a manner which avoids the first queue. The system includes a first validator for validating an entitlement of a customer to receive an assigned time in the future for accessing the attraction via the second queue, a media distributor for distributing a media to an entitled customer, the media including the assigned time at which the entitled customer is entitled to access the attraction in the future, and a second validator for validating the entitled customer access to the attraction at the time provided on the media. In accordance with a method of the invention, a customer may access an attraction in a manner which avoids standing in a first waiting line by verifying entitlement to utilize a second queue, obtaining a pass entitling the customer to access the attraction at a future time, and returning to the attraction at the future time and gaining access with the pass. In this method, the customer may leave the vicinity of the attraction between when the pass is issued and the future time at which the customer is entitled to access to the attraction.

212 Claims, 24 Drawing Sheets

U.S. PATENT DOCUMENTS

| | | | |
|---|---|---|---|
| 4,598,275 A | 7/1986 | Ross et al. ............... 340/573.4 |
| 4,752,776 A | 6/1988 | Katzenstein ............ 340/10.42 |
| 4,780,599 A | 10/1988 | Baus ......................... 235/383 |
| 4,802,218 A | 1/1989 | Wright et al. |
| 4,816,658 A | 3/1989 | Khandwala et al. |
| 4,818,998 A | 4/1989 | Apsell et al. .............. 342/444 |
| 4,889,981 A | 12/1989 | Harbers, Jr. |
| 5,006,983 A | 4/1991 | Wayne et al. |
| 5,066,853 A | 11/1991 | Brisson |
| 5,134,720 A | 7/1992 | Gamsee et al. .......... 455/164.1 |
| 5,210,786 A | 5/1993 | Itoh ........................... 455/445 |
| 5,245,163 A | 9/1993 | Bar-Yehuda |
| 5,287,269 A | 2/1994 | Dorrough et al. |
| 5,305,197 A | 4/1994 | Axler et al. |
| 5,317,318 A | 5/1994 | Thomas et al. ............... 342/44 |
| 5,408,417 A | 4/1995 | Wilder |
| 5,429,361 A | 7/1995 | Raven et al. |
| 5,455,851 A | 10/1995 | Chaco et al. ................. 379/38 |
| 5,461,371 A | 10/1995 | Matsumoto et al. ... 340/825.25 |
| 5,491,326 A | 2/1996 | Marceau et al. |
| 5,502,806 A * | 3/1996 | Mahoney et al. ........... 345/839 |
| 5,541,835 A | 7/1996 | Dextraze et al. .............. 705/10 |
| 5,655,053 A | 8/1997 | Renie .......................... 386/17 |
| 5,724,520 A | 3/1998 | Goheen |
| 5,754,654 A | 5/1998 | Hiroya et al. ................. 705/76 |
| 5,893,097 A | 4/1999 | Hayata et al. |
| 5,929,848 A | 7/1999 | Albukerk et al. ........... 345/700 |
| 5,940,510 A | 8/1999 | Curry et al. .................. 705/65 |
| 5,946,444 A | 8/1999 | Evans et al. .................. 386/46 |
| 5,948,040 A | 9/1999 | DeLorme et al. ........... 701/201 |
| 5,966,654 A * | 10/1999 | Croughwell et al. ...... 455/414.1 |
| 5,978,770 A * | 11/1999 | Waytena et al. ................ 705/5 |
| 5,987,420 A * | 11/1999 | Maeda et al. .................. 705/5 |
| 5,987,421 A | 11/1999 | Chuang |
| 6,094,640 A | 7/2000 | Goheen ......................... 705/5 |
| 6,173,209 B1 | 1/2001 | Laval et al. .................. 700/91 |
| 6,216,227 B1 | 4/2001 | Goldstein et al. ........... 713/172 |
| 6,260,027 B1 | 7/2001 | Takahashi et al. ............. 705/69 |
| 6,329,919 B1 | 12/2001 | Boies et al. ............. 340/573.1 |
| 6,363,351 B1 | 3/2002 | Moro ............................ 705/1 |
| 6,374,176 B1 | 4/2002 | Schmier et al. ............. 701/200 |
| 6,424,623 B1 | 7/2002 | Borgstahl et al. ........... 370/230 |
| 6,454,174 B1 | 9/2002 | Sansone ..................... 235/494 |
| 6,463,534 B1 | 10/2002 | Geiger et al. ............... 713/168 |
| 6,464,623 B1 | 10/2002 | Laur et al. .................... 483/41 |
| 6,490,409 B1 | 12/2002 | Walker ......................... 72/458 |
| 6,529,786 B1 | 3/2003 | Sim ............................ 700/90 |

FOREIGN PATENT DOCUMENTS

| | | |
|---|---|---|
| FR | 2612669 | 9/1988 |
| FR | 2650095 | 1/1991 |
| FR | 2805895 A | 9/2001 |
| GB | 2193359 A | 2/1988 |
| GB | 2228123 A | 8/1990 |
| GB | 9523443.1 | 11/1995 |
| GB | 2307324 A | 5/1997 |
| JP | 1-134565 | 5/1989 |
| JP | 5-73596 | 3/1993 |
| JP | 6019940 | 1/1994 |
| JP | 6203238 | 7/1994 |
| JP | 7-234893 | 9/1995 |
| JP | 8-315188 | 11/1996 |
| JP | 9327991 | 12/1997 |
| JP | 10049571 | 2/1998 |
| WO | WO90/09002 | 8/1990 |
| WO | WO 90/18534 | 5/1997 |

* cited by examiner

Tables

| Table Name | Table Definition |
|---|---|
| contr_feed_info | Information about feed from Master Controller |
| opsheet_feed_info | Information about feed from OpSheet |
| vq_cle_forecast_info | Forecasted capacity limiting event (CLE) information, to forecast guest count |
| vq_disp_rate_log | Dispense rate log information. A row is inserted every time the dispense rate is calculated. |
| vq_error_log | Error log, for internal use only |
| vq_loc_daily_info | Location daily information, by location and date |
| vq_loc_port_info | Location-Port mapping table. To be updated by APES Admin only. |
| vq_loc_scenario | Location scenario override information for specific location, datetime and situation |
| vq_loc_schedule | Location calculation parameter schedule. Effective and expiration dates, along with schedule effective flag, specify whether to use schedule or default values. |
| vq_no_show_lookup | Lookup table for No Show factor, used in calculation of dispense rate. Defined for range of virtual queue wait time. |
| vq_scenario_info | Scenario setup information (Admin only) |
| vq_standby_wait | Standby wait information, for waitfree locations only |

FIG. 5A

| Column Table | Column Name | Column Datatype | Column Null Options | Column Comment | Column PK | Column FK |
|---|---|---|---|---|---|---|
| vq_cle_forecast | cle_type_id | integer | NULL | Capacity Limiting Event (CLE) type; usually 'U' indicating unit change | No | No |
| vq_cle_forecast | last_update_time | datetime year to fraction(5) | NOT NULL | Datetime when the record was last updated | No | No |
| vq_cle_forecast | last_update_user | char(8) | NOT NULL | User ID that updated the record last | No | No |
| vq_cle_forecast | reading_time | integer | NULL | Time of "units" reading | No | No |
| vq_cle_forecast | vq_cle_forecast_id | serial | NOT NULL | Unique identifier (generated by the system) for CLE forecast information | Yes | No |
| vq_cle_forecast | vq_dispense_rate | integer | NULL | Dispense rate for given unit values | No | No |
| vq_cle_forecast | vq_loc_cle_type_id | integer | NULL | Type of CLE: Open, Close, Unit Change, Show, etc. | No | No |
| vq_cle_forecast | vq_loc_daily_id | integer | NOT NULL | Unique identifier (generated by the system) for location daily information | No | Yes |
| vq_cle_forecast | vq_loc_utilization | integer | NULL | Utilization of location (eg. 80% utilization means the actual guest carried is 80% of total guest capacity) | No | No |
| vq_cle_forecast | vq_value_1 | integer | NULL | Number of units | No | No |
| vq_cle_forecast | vq_value_2 | integer | NULL | Number of special need units | No | No |
| vq_contr_feed_info | business_date | date | NULL | PC business date when feed was sent | No | No |
| vq_contr_feed_info | controller_feed_id | serial | NOT NULL | Unique serial ID (generated by the system) that identifies the Master Controller feed information | Yes | No |
| vq_contr_feed_info | error_no | integer | NULL | Error number from turnstile | No | No |
| vq_contr_feed_info | guest_window_end | datetime HOUR to MINUTE | NULL | Guest window end datetime, as printed on virtual queue (VQ) ticket | No | No |
| vq_contr_feed_info | guest_window_start | datetime HOUR to MINUTE | NULL | Guest window start datetime, as printed on VQ ticket | No | No |
| vq_contr_feed_info | last_update_time | datetime year to fraction(5) | NOT NULL | Datetime when the record was last updated | No | No |
| vq_contr_feed_info | last_update_user | char(8) | NOT NULL | User ID that updated the record last | No | No |
| vq_contr_feed_info | no_of_tkt_issued | integer | NULL | Number of tickets issued in (?) time frame | No | No |
| vq_contr_feed_info | printer_number | char(2) | NULL | Printer number for VQ | No | No |
| vq_contr_feed_info | reading_time | integer | NULL | PC business time when feed sent, 0 to 2400 | No | No |

FIG. 5B

| Column Table Name | Column Name | Column Datatype | Column Null Option | Column Comment | Column is PK | Column is FK |
|---|---|---|---|---|---|---|
| vq_contr_feed_info | vq_curr_wait_time | integer | NULL | Current wait time in minutes (eg. 130 minutes) | No | No |
| vq_contr_feed_info | vq_disp_time_int | smallint | NULL | Ticket dispense time interval | No | No |
| vq_contr_feed_info | vq_dispense_rate | integer | NULL | Ticket dispense rate | No | No |
| vq_contr_feed_info | vq_gst_win_minutes | integer | NULL | Guest window minutes (the difference between guest window start and end; eg. 60 minutes) | No | No |
| vq_contr_feed_info | vq_guest_count | integer | NULL | VQ guest count (?) | No | No |
| vq_contr_feed_info | vq_loc_port_id | integer | NULL | Unique serial ID (generated by the system) that identifies the location/attraction | No | Yes |
| vq_contr_feed_info | vq_mc_processed | char(1) | NULL | Whether Master Controller information is processed by OpSheet (Y/N) | No | No |
| vq_contr_feed_info | vq_min_wait_time | smallint | NULL | Minimum wait time set for the attraction (eg. 40 minutes) | No | No |
| vq_disp_rate_log | dis_reduction_fact | smallint | NULL | Factor by which distribution of ticket dispensing should be reduced during downtime | No | No |
| vq_disp_rate_log | dispense_rate | integer | NULL | Virtual queue ticket dispense rate | No | No |
| vq_disp_rate_log | forecast_gc | integer | NULL | Forecasted guest carried, used in calculations | No | No |
| vq_disp_rate_log | forecast_time_min | smallint | NULL | Time interval to forecast guest count | No | No |
| vq_disp_rate_log | last_update_time | datetime YEAR to FRACTION(5) | NOT NULL | Datetime when the record was last updated | No | No |
| vq_disp_rate_log | last_update_user | char(8) | NOT NULL | User ID that updated the record last | No | No |
| vq_disp_rate_log | location_id | integer | NULL | OpSheet location ID, from location_info | No | No |
| vq_disp_rate_log | noshow_factor_pcnt | smallint | NULL | Percent of people that do not show up for a given virtual wait time, applied in the calculations to adjust dispense rate | No | No |
| vq_disp_rate_log | percent_capacity | smallint | NULL | Percent of location's total capacity for VQ (eg. 80%) | No | No |
| vq_disp_rate_log | thrc | integer | NULL | Location's theoritical hourly ride capacity (THRC) | No | No |
| vq_disp_rate_log | utilization_pcnt | smallint | NULL | Location utilization percent, used for computing actual capacity from THRC | No | No |
| vq_disp_rate_log | value_1 | smallint | NULL | Number of regular units forecasted | No | No |
| vq_disp_rate_log | vq_disp_rate_id | serial | NOT NULL | Unique identifier for dispense rate log | Yes | No |
| vq_disp_rate_log | vq_disp_time_int | smallint | NULL | Dispense time interval (eg. 5 | No | No |

FIG. 5C

| Column Table Name | Column Name | Column Datatype | Column Null Option | Column Comment | Column Is PK | Column Is FK |
|---|---|---|---|---|---|---|
| | | | | minutes) | | |
| vq_disp_rate_log | vq_loc_port_id | integer | NOT NULL | Unique identifier for APES location | No | Yes |
| vq_error_log | comments | varchar(80) | NULL | Error log description | No | No |
| vq_error_log | error_log_id | serial | NOT NULL | System-generated error log ID | Yes | No |
| vq_error_log | last_update_time | datetime year to fraction(5) | NOT NULL | Datetime when the record was last updated | No | No |
| vq_error_log | last_update_user | char(8) | NOT NULL | User ID that updated the record last | No | No |
| vq_error_log | program_name | char(30) | NULL | Name of program on which error occurred | No | No |
| vq_error_log | sql_isamcode | integer | NULL | SQL ISAM error code | No | No |
| vq_error_log | sqlcode | integer | NULL | SQL error code | No | No |
| vq_error_log | vq_lan_address | char(2) | NULL | LAN address, as specified by Ride and Show for the location Master Controller (MC) | No | No |
| vq_error_log | vq_loc_port_id | integer | NULL | Location identifier on which error occurred | No | No |
| vq_error_log | vq_park_address | char(2) | NULL | Park address. May be different from park code, specified by Ride and Show for location MC. | No | No |
| vq_loc_daily_info | business_date | date | NULL | Business date | No | No |
| vq_loc_daily_info | last_update_time | datetime year to fraction(5) | NOT NULL | Datetime when the record was last updated | No | No |
| vq_loc_daily_info | last_update_user | char(8) | NOT NULL | User ID that updated the record last | No | No |
| vq_loc_daily_info | vq_loc_daily_id | serial | NOT NULL | Unique identifier (generated by the system) for location daily information | Yes | No |
| vq_loc_daily_info | vq_loc_port_id | integer | NULL | Unique identifier for location | No | Yes |
| vq_loc_port_info | dis_reduction_fact | smallint | NULL | Factor by which distribution of ticket dispensing should be reduced during downtime | No | No |
| vq_loc_port_info | do_abuse_check | char | NULL | Whether abuse check should be performed or not | No | No |
| vq_loc_port_info | downtime_effective | char | NULL | Flag to indicate whether downtime is currently effective | No | No |
| vq_loc_port_info | forecast_time_min | integer | NULL | Guest count forecast time interval (usually 60 minutes) | No | No |
| vq_loc_port_info | ftp_arg1 | char(10) | NULL | ftp user-id to connect to Bridge server | No | No |
| vq_loc_port_info | ftp_arg2 | char(10) | NULL | ftp password to connect to Bridge server | No | No |
| vq_loc_port_info | ftp_script_name | varchar(50) | NULL | ftp script to trigger ftp data | No | No |

FIG. 5D

| Column Table Name | Column Name | Column Datatype | Column Null Option | Column Comment | Column is PK | Column is FK |
|---|---|---|---|---|---|---|
|  |  |  |  | from Parks-APES server to Bridge server |  |  |
| vq_loc_port_info | last_update_time | datetime year to fraction(5) | NOT NULL | Datetime when the record was last updated | No | No |
| vq_loc_port_info | last_update_user | char(8) | NOT NULL | User ID that updated the record last | No | No |
| vq_loc_port_info | location_number | char(4) | NOT NULL | Location number (as used by IEs in OpSheet) | No | No |
| vq_loc_port_info | origin_id | integer | NOT NULL | Origin identifier of park, as in OpSheet | No | No |
| vq_loc_port_info | override_effective | char | NULL | Flag to indicate whether scenario override is effective | No | No |
| vq_loc_port_info | park_code | char(2) | NULL | Park code: AK, MK, EC, ST | No | No |
| vq_loc_port_info | percent_capacity | smallint | NULL | Percent of the location's total capacity for VQ (eg. 80%) | No | No |
| vq_loc_port_info | schedule_effective | char | NULL | Flag to indicate whether scenario schedule is effective | No | No |
| vq_loc_port_info | server_name | varchar(30) | NOT NULL | Name of the Bridge server dedicated to this location/attraction | No | No |
| vq_loc_port_info | survey_time_min | integer | NULL | Survey time in minutes (same as forecasted time in minutes) | No | No |
| vq_loc_port_info | vq_close_time | datetime HOUR to MINUTE | NULL | Actual close time of attraction | No | No |
| vq_loc_port_info | vq_disp_time_int | smallint | NULL | Dispense time interval in minutes, used to increase the guest window | No | No |
| vq_loc_port_info | vq_gst_win_min | integer | NULL | Minutes during which guest can visit the location. Time is between guest_window_start and guest_window_end. | No | No |
| vq_loc_port_info | vq_lan_address | char(2) | NOT NULL | Attraction name (coded) where VQ is functional | No | No |
| vq_loc_port_info | vq_loc_port_id | serial | NOT NULL | Unique serial ID (generated by the system) that identifies the VQ attraction/park | Yes | No |
| vq_loc_port_info | vq_loc_utilization | smallint | NULL | Location utilization percent, used for computing actual capacity from THRC | No | No |
| vq_loc_port_info | vq_max_gst_count | integer | NULL | Maximum guest count used in the calculations for dispense rate | No | No |
| vq_loc_port_info | vq_min_before_cls | integer | NULL | Number of minutes before close to stop printing VQ tickets | No | No |
| vq_loc_port_info | vq_min_down_time | integer | NULL | Minimum down time to be used while creating downtime | No | No |

FIG. 5E

| Column Table Name | Column Name | Column Datatype | Column Null Option | Column Comment | Column Is PK | Column Is FK |
|---|---|---|---|---|---|---|
| | | | | scenario | | |
| vq_loc_port_info | vq_min_gst_count | integer | NULL | Minimum guest count used in the calculations for dispense rate | No | No |
| vq_loc_port_info | vq_min_wait_time | integer | NULL | Minimum virtual wait time (eg. 40 minutes) | No | No |
| vq_loc_port_info | vq_park_address | char(2) | NOT NULL | Park name (coded) where VQ is functional | No | No |
| vq_loc_port_info | vq_soft_close_time | datetime HOUR to MINUTE | NULL | The time at which VQ stops printing tickets (close_time - min_before_cls) | No | No |
| vq_loc_scenario | expected_uptime | integer | NULL | Expected uptime (absolute) from location down situation | No | No |
| vq_loc_scenario | gst_win_minutes | smallint | NULL | Guest window (in minutes) | No | No |
| vq_loc_scenario | last_update_time | datetime year to fraction(5) | NOT NULL | Datetime when the record was last updated | No | No |
| vq_loc_scenario | last_update_user | char(8) | NOT NULL | User ID that updated the record last | No | No |
| vq_loc_scenario | percent_capacity | smallint | NULL | Percent of location's total capacity for VQ (eg. 80%) | No | No |
| vq_loc_scenario | vq_disp_time_int | smallint | NULL | VQ ticket dispense time interval (5 minutes) | No | No |
| vq_loc_scenario | vq_dispense_rate | integer | NULL | Number of tickets to dispense in vq_disp_time_int | No | No |
| vq_loc_scenario | vq_loc_port_id | integer | NULL | Unique location identifier | No | Yes |
| vq_loc_scenario | vq_loc_scenario_id | serial | NOT NULL | Unique identifier (generated by the system) for location scenario information | Yes | No |
| vq_loc_scenario | vq_scenario_id | integer | NOT NULL | Unique scenario identifier | No | Yes |
| vq_loc_scenario | vq_scn_eff_date | date | NULL | Scenario effective date | No | No |
| vq_loc_scenario | vq_scn_eff_time | integer | NULL | Scenario effective time | No | No |
| vq_loc_schedule | effective_date | date | NULL | Schedule effective datetime | No | No |
| vq_loc_schedule | effective_time | datetime HOUR to MINUTE | NULL | Schedule effective time | No | No |
| vq_loc_schedule | expiration_date | date | NULL | Schedule expiration datetime | No | No |
| vq_loc_schedule | last_update_time | datetime year to fraction(5) | NOT NULL | Datetime when the record was last updated | No | No |
| vq_loc_schedule | last_update_user | char(8) | NOT NULL | User ID that updated the record last | No | No |
| vq_loc_schedule | percent_capacity | smallint | NULL | Percent capacity used for VQ guest count calculations | No | No |
| vq_loc_schedule | vq_close_time | datetime hour to minute | NULL | Actual close time of the attraction | No | No |
| vq_loc_schedule | vq_disp_time_int | smallint | NULL | VQ ticket dispense time | No | No |

FIG. 5F

| Column Table Name | Column Name | Column Datatype | Column Null Option | Column Comment | Column is PK | Column is FK |
|---|---|---|---|---|---|---|
| | | | | interval (in minutes) | | |
| vq_loc_schedule | vq_dispense_rate | integer | NULL | VQ ticket dispense rate | No | No |
| vq_loc_schedule | vq_gst_win_min | integer | NULL | Guest window (in minutes) | No | No |
| vq_loc_schedule | vq_loc_port_id | integer | NOT NULL | Unique serial ID (generated by the system) that identifies the VQ attraction/park | No | Yes |
| vq_loc_schedule | vq_loc_schedule_id | serial | NOT NULL | Unique serial ID (generated by the system) that identifies the attraction schedule | Yes | No |
| vq_loc_schedule | vq_wait_time | integer | NULL | Current virtual queue wait time | No | No |
| vq_no_show_lookup | last_update_time | datetime year to fraction(5) | NOT NULL | Datetime when the record was last updated | No | No |
| vq_no_show_lookup | last_update_user | char(8) | NOT NULL | User ID that updated the record last | No | No |
| vq_no_show_lookup | noshow_factor_pcnt | smallint | NOT NULL | Percent factor to be used to adjust Distribution Percent (DPS). Increment dispense rate by this factor. | No | No |
| vq_no_show_lookup | vq_loc_port_id | integer | NOT NULL | Unique serial ID (generated by the system) that identifies the VQ attraction/park | No | Yes |
| vq_no_show_lookup | vq_no_show_id | serial | NOT NULL | System-generated ID value for no show | Yes | No |
| vq_no_show_lookup | vq_wait_minutes_fm | smallint | NOT NULL | VQ wait minutes from | No | No |
| vq_no_show_lookup | vq_wait_minutes_to | smallint | NOT NULL | VQ wait minutes to | No | No |
| vq_opsheet_feed | business_date | date | NULL | Current business date | No | No |
| vq_opsheet_feed | feed_type | char(1) | NULL | Indicates if this is an OpSheet_feed(O), override row from scenario(S), downtime override (D) | No | No |
| vq_opsheet_feed | feed_write_time | datetime hour to second | NULL | Time at which OpSheet performed write/sent the file | No | No |
| vq_opsheet_feed | guest_window_end | datetime hour to minute | NULL | Guest window end time | No | No |
| vq_opsheet_feed | guest_window_start | datetime hour to minute | NULL | Guest window start time | No | No |
| vq_opsheet_feed | last_update_time | datetime year to fraction(5) | NOT NULL | Datetime when the record was last updated | No | No |
| vq_opsheet_feed | last_update_user | char(8) | NOT NULL | User ID that updated the record last | No | No |
| vq_opsheet_feed | opsheet_feed_id | serial | NOT NULL | Unique serial ID (generated by the system) for opsheet_feed_info table | Yes | No |

FIG. 5G

| Column Table Name | Column Name | Column Datatype | Column Null Option | Column Comment | Column Is PK | Column Is FK |
|---|---|---|---|---|---|---|
| vq_opsheet_feed | vq_curr_wait_time | integer | NULL | Current virtual wait time (in minutes) | No | No |
| vq_opsheet_feed | vq_disp_time_int | smallint | NULL | Dispense time interval (eg. 5 minutes) | No | No |
| vq_opsheet_feed | vq_dispense_rate | integer | NULL | Ticket dispense rate, as recommended by OpSheet | No | No |
| vq_opsheet_feed | vq_gst_win_minutes | integer | NULL | VQ guest window minutes (eg. 60 minutes) | No | No |
| vq_opsheet_feed | vq_guest_count | integer | NULL | Guest count to be used for all calculations | No | No |
| vq_opsheet_feed | vq_loc_port_id | integer | NOT NULL | Unique serial ID (generated by the system) for vq_loc_port_info table | No | Yes |
| vq_opsheet_feed | vq_loc_scenario_id | integer | NULL | Unique identifier (generated by the system) for location scenario information | No | Yes |
| vq_opsheet_feed | vq_min_wait_time | integer | NULL | Minimum wait time at virtual queue (eg. 40 minutes) | No | No |
| vq_opsheet_feed | vq_ops_processed | char(1) | NULL | Row processed (sent to Bridge server for Master Controller), Y/N | No | No |
| vq_scenario_info | last_update_time | datetime year to fraction(5) | NOT NULL | Datetime when the record was last updated | No | No |
| vq_scenario_info | last_update_user | char(8) | NOT NULL | User ID that updated the record last | No | No |
| vq_scenario_info | scenario_desc | varchar(60) | NULL | Scenario description | No | No |
| vq_scenario_info | scenario_name | char(25) | NULL | Unique scenario name, not associated with any attraction | No | No |
| vq_scenario_info | vq_scenario_id | serial | NOT NULL | Unique identifier (generated by the system) for scenario information | Yes | No |

| Wait Free Administration | | | | | |
|---|---|---|---|---|---|
| Park: DISNEY'S ANIMAL KINGDOM | Location: WILDLIFE EXPRESS - CONSERVATION STATION | | | | 2 |

Daily Forecast | No Show LookUp | Location Scheduling

| Loc Port Id | No Show Id | Dntime Minutes Fm | Dntime Minutes To | Noshow Factor Pcnt | Last Update User |
|---|---|---|---|---|---|
| 2 | 1 | | 30 | 10 | DDJ1 |
| 2 | 2 | 31 | 60 | 15 | DDJ1 |
| 2 | 3 | 61 | 200 | 18 | DDJ1 |

| Wait Free Administration | | | | | |
|---|---|---|---|---|---|
| Park: DISNEY'S ANIMAL KINGDOM | Location: WILDLIFE EXPRESS - CONSERVATION STATION | | | | 2 |

Daily Forecast | No Show LookUp | Location Scheduling

| Loc Port Id | Loc Schedule Id | Effective Date | Expiration Date | Effective Time | %Capacity |
|---|---|---|---|---|---|
| 2 | 1 | | 5/1/99 | 10:20 | |

FIG. 7C

WaitFree Location Information

Park: DISNEY'S ANIMAL KINGDOM

| Location | Override Effective | Do Abuse Check | Schedule Effective |
|---|---|---|---|
| WILDLIFE EXPRESS - CONSERVATION STATION | | Y | |

| | | | |
|---|---|---|---|
| Override Effective: | Min Wait Time: 40 | Min Down Time: | 15 |
| Schedule Effective: | Dis Reduction Fact: 10 | Percent Capacity: | 80 |
| Downtime Effective: N | Min Gst Count: 1800 | Disp Time Int: | 5 |
| Do Abuse Check: Y | Max Gst Count: 2400 | Forecast Time Min: | 60 |
| Minutes Before Close: | Loc Utilization: 75 | Close Time: | 21:45 |
| Last Update: PRS2  4/22/99 17:48:35 | | Soft Close Time: | |

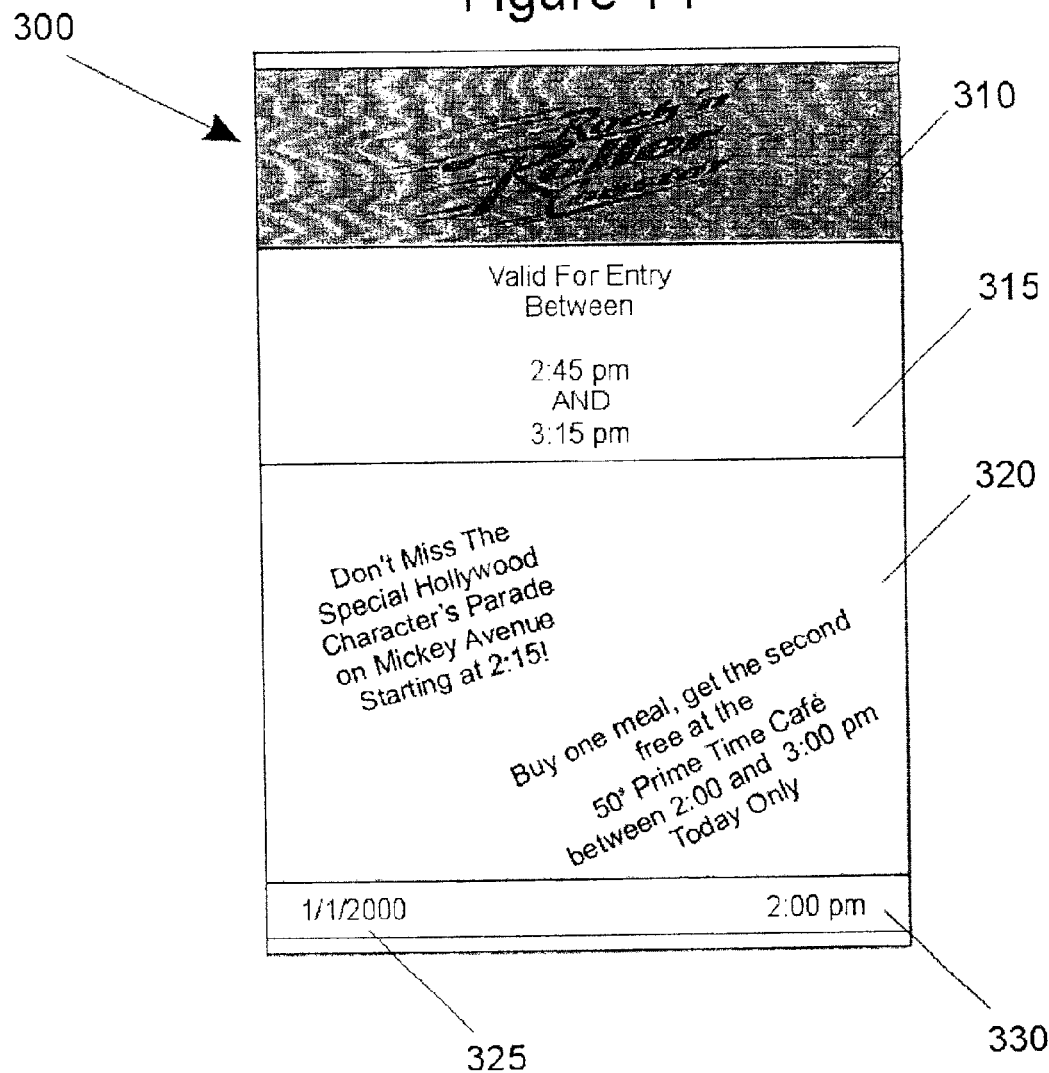

METHOD AND APPARATUS FOR MANAGING ATTRACTION ADMISSION

This application is a CIP of Ser. No. 09/372,405, filed Aug. 10, 1999, now U.S. Pat. No. 6,173,209.

FIELD OF THE INVENTION

The invention relates to methods and apparatus for managing admission or entry to an attraction, such as a theme-park ride.

BACKGROUND ART

There are a number of circumstances where people have to wait in line in order to do something. At amusement parks, for example, a customer often needs to wait in line to ride an attraction, and the most popular attractions usually have the longest lines. Other situations where people have to wait in line are at banks, a bakery, at government offices, to buy tickets for shows or concerts, to gain admission to museums, or at any other place where the number of people arriving to take advantage of goods or services at any one time exceeds the speed at which any one customer or group of customers can be served. When such a situation occurs, a line forms.

Although customers wait in line, none prefer it. People feel that time spent in line is time wasted. A customer would much rather come back later when there is no line so that the customer can do other things instead of waiting in line. This problem is particularly acute in an amusement park. An amusement park may have hundreds of attractions, including rides, shops, shows, stores, games, parades, displays, and food services. If a customer must wait in line for each attraction, the customer may only be able to utilize a small number of attractions in a visit. For particularly popular attractions, the lines can require waiting for a number of hours, so that a customer might only be able to utilize five or six attractions in a ten hour visit.

Not only is the customer frustrated at not being able to access more attractions, but the amusement park itself suffers from having underutilized attractions because the customers are waiting in line for other attractions. Instead of waiting in line for a single attraction, a customer could be riding other attractions, eating food, shopping at stores, playing games, or other activities. It would be preferable if the customer could avoid the line associated with an attraction while still being able to utilize the attraction sometime during the customer's visit.

There are a number of techniques in the prior art to handle the problems associated with waiting in line. One approach to dealing with people in lines is to attempt to make the waiting more enjoyable or to make the time go faster. In some arrangements, customers waiting in line are entertained, such as with television, music, reading material, and so forth, so as to distract them and take their mind off of waiting in line. However, such schemes do nothing to prevent the need to wait in line.

Other prior art schemes have been used to attempt to eliminate the need to stand in line. One such arrangement is where each customer arriving at a location of service is provided with a number that increments for each newly arriving customer. Numbers are called in order, with the holder of a called number being entitled to service. Such schemes are often used at bakeries and other food establishments. This arrangement avoids the need for customers to stand in a physical line in order to determine the order in which they will be served. When the customer observes that the current number being serviced is so much lower than the customers assigned number, the customer might leave the establishment and return when the customer expects the customer's number to be called.

This scheme requires a lot of guesswork by the customer, and provides no clear guidance for the customer as to when the customer should return. More often than not, the expected time delay between the current number being serviced and the customer's number is such that the customer feels compelled to wait at the establishment to avoid missing the customer's opportunity to be served. So although a physical line might be avoided in such a scheme, the waiting itself is not really avoided.

Some prior art schemes at amusement parks and other attractions have attempted to avoid the need to have customers wait in line. In a first known arrangement, a number of tickets are sold or distributed based on an operating time of an attraction and the capacity of the attraction. A problem with this scheme is that it is a "dumb" system. The assumption is that the attraction will have predictable loading and operating times, and will operate at the capacity of the tickets distributed. A problem with this system is that it does not take into account actual real time performance of the attraction, nor the dynamic real time capacity of the attraction.

Another problem with this first system or scheme is that a customer can line up for multiple tickets for the same scheduled attraction operation. If the customer keeps the multiple tickets, the attraction does not operate at peak capacity, leading to a situation where the efficiency of the attraction (number of riders per attraction cycle) is lower than if a simple wait in line scheme is used. In addition, the system does not take down time or slow downs into account, so that tickets for later operation are distributed when the attraction may not actually be operating, or when it may be still servicing customers from earlier operation times. This leads to waiting in line or to an inability to use the tickets at all.

Another problem with the scheme is that it requires all customers to use the system. There is no alternative scheme available that a customer could use in place of the scheme, even when the scheme leads to more delays. If the customer does not obtain a ticket, then the customer is not permitted to access an attraction.

Another attempt to eliminate or reduce the need to stand in line is described in U.S. Pat. No. 5,502,806 to Mahoney (the Mahoney patent or the '806 patent). The Mahoney patent describes a waiting line management system where a customer is issued a card or electronic ID device and by which the customer is permitted to use a plurality of computer access terminals. The access terminals are located, for example, in an amusement park. A customer using the card at the access terminal is advised of time slot windows available for a number of attractions and performances. The customer chooses one or more time slots for one or more attractions and thereby is able to pre-schedule the use of attractions.

A problem with the Mahoney scheme is that it allows customers to reserve the right to use a number of attractions, potentially preventing others from using the attractions. Another problem is that by allowing the customer to select a time slot, the Mahoney system lacks responsiveness to changing ride conditions and performance data. In addition, the slots themselves are determined by a pre-established allotment. Such advance assignment of time slots suffers from the same disadvantages as the above-described first known scheme in that there is no dynamic changing of time slot allocation based on actual attraction conditions. This condition could result in customers being required to stand in line if conditions have slowed down, eliminating the very benefit the system is intended to provide. Mahoney suggests that if such a situation occurs, then customers who do not have passes will be required to wait longer than customers that do have passes. However, such a solution still could require substantial wait time for customers with passes, and leads to unacceptable wait times for customers without passes. Another problem with permitting customers to select time slots is that all of the time slots may be selected for certain periods of the day, such as 2–5 p.m., while few or none of the slots may be selected for other periods of the day, such as 12–1 p.m. In this arrangement, the attraction may be underutilized during certain periods of time.

The Mahoney scheme manages slot times allocation based on a fixed capacity of an individual attraction. In actual practice, the capacity of an attraction may not be achievable due to a variety of factors, including number of customers, the demographics of the customers, attraction performance, the number of customer vehicles associated with the ride which are in service over time, the number of staff members available to operate the ride, safety factors, weather, etc. For example, the total number of customers in a park who may even desire to access any attraction may be much less at one time of day (such as at opening) than another time of day (such as mid-day). In addition, the capacity of an attraction may change due to a variety of circumstances. A ride may be taken out of service for a period of time or one or more "cars" or associated customer vehicles may be removed from the ride, lessening the capacity. The number of staff available to operate the ride may fluctuate during the day. If a fewer number of staff members are available, such as at a shift change, the number of patrons which may be loaded into each customer car or the number of cars which may be loaded may be reduced. When slow downs occur and customers with passes must wait in line, the time slots reserved by those customers for other attractions may expire. This not only frustrates the customers with passes, but leads to potentially empty seats on other attractions.

An improved method and apparatus for managing access to an attraction is desired.

SUMMARY OF THE INVENTION

The invention is a system and method for managing admission to an attraction that provides a customer with a choice of standing in line for the attraction or having a spot reserved for admission to the attraction at a later time without standing in line. The invention also provides an improved method and apparatus for managing admission to an attraction that can be constantly adjusted to account for the dynamic real time capacity of the attraction. The invention also provides a method and apparatus for managing admission to an attraction that can prevent customers from acquiring multiple reservations for the same attraction.

In one or more embodiments, the system provides two access points or queues at an attraction. A first queue is a traditional "wait in line" queue where customers line up for the next available chance to use the attraction. A second queue provides a customer with access to the attraction which avoids the traditional, first queue.

The system includes a first validator for validating the right of a customer to receive an assigned future time to access the second queue. In one embodiment, the system also includes a media distributor for distributing an entitlement in the form of a pass to an entitled customer. The pass provides a time or time range assigned by the system during which the entitled customer is entitled to access the attraction in the future via the second queue. The system includes a second validator for validating that the customer is entitled to access to the attraction via the second queue at the assigned time. in one embodiment, the pass issued to the customer establishes the entitlement of the customer to access the attraction via the second queue by the second validator.

In accordance with an embodiment of a method of the invention, a customer may access an attraction in a manner which avoids standing in a first waiting line by verifying entitlement to utilize a second queue, being assigned a future time for accessing the attraction via the second queue, returning to the attraction at the future time and validating the entitlement of the customer to gain access at the assigned time. In one embodiment, a customer is issued a pass entitling the customer to access the attraction at a future time via the second queue and the customer uses the pass to establish entitlement to access the attraction at the future time. In this method, the customer may leave the vicinity of the attraction between when the pass is issued and the future time at which the customer is entitled to access to the attraction.

In accordance with an embodiment of the method and system of the invention, a variety of factors are utilized to determine the future time assigned to the customer and associated with the pass provided the customer. In one embodiment, the system and method are arranged to continuously adjust the number of passes and/or assigned times in order to compensate for changes in ride capacity, demand and other factors in order to maintain the attraction at optimum operating conditions.

In one embodiment of the invention, a system is associated with more than one attraction, such as rides in an amusement park. The systems are linked in a manner which permits verification that a customer accessing the second queue of one attraction has not already been issued a pass entitling them to access the second queue of another attraction.

In one embodiment of the invention, a printed pass is generated that includes the time or the time range during which the patron can access the attraction without having to wait in a first physical line. The patron presents the pass at a second queue during the designated time and gains entry. As discussed, the pass can include various features that allow for its authentication and/or validation at the second queue. The name of the designated attraction and the time or time range can be printed on the pass for the convenience of the patron. In addition, targeted advertising can be printed on the pass. This advertising can be varied by the system, and each pass could include its own unique message that is different from any other generated pass.

Various advantages are realized by allowing targeted advertising to be printed on individual passes as they are generated. For example, special features or events that are occurring during the patrons wait can be identified. Thus, the patron maximizes his or her time while in the park and park management can promote various events and attractions. In addition, restaurants, shops, or other attractions that are within the area of the attraction the patron is waiting for could be identified and promoted through such advertising. Yet another advantage is that park management could utilize such advertising to influence pedestrian traffic patterns. That is, if a particular area is known to be overcrowded at a predetermined time, the generated advertising could promote places or events in a different location, before and during the predetermined time. Since the system is independent and variable, such traffic management could be generated instantaneously, whenever events (planned or unexpected) warrant.

Yet another advantage of having the system print targeted material on the passes is the ability to send predetermined messages to individual patrons or groups of patrons. In one embodiment of the invention, each patron is given a unique admission media or ticket that allows them to obtain the pass that allows them to avoid waiting in the physical queue. By using the admission media to obtain the pass, the system is then able to recognize and identify each patron. Thus, messages targeted to that patron can be printed or otherwise included on the pass. For example, "John Doe, please meet your wife at the main gate at 2:00 p.m." could be printed on his pass by request. As another example, large groups of people (often younger children) tour such parks together. Whenever desired, messages could be printed on their passes such as "meet the group at 2:00 p.m." or "remember, the shuttle departs at 3:00 p.m." By providing an identifying link between the patron and the system, predetermined messages, promotional information, or advertising can be customized and directed to specific patrons or groups or patrons.

Further objects, features, and advantages of the present invention over the prior art will become apparent from the detailed description of the drawings which follows, when considered with the attached figures.

BRIEF DESCRIPTION OF THE DRAWINGS

FIGS. 5A–5H illustrate table names/definitions and a data dictionary of terms for use in a system and method of the invention;

FIGS. 7A–7C illustrate embodiments of viewable screens which permit a user of an embodiment of a system of the invention to view current system settings and adjust those settings;

FIG. 8 illustrates an embodiment of a viewable screen which enables a user to establish a variety of settings for a specific attraction;

FIG. 9 illustrates an embodiment of a viewable screen displaying information associated with a master server of a system of an embodiment of the invention;

FIG. 14 illustrates a sample printed pass allowing for patron entry into a designated ride during a particular time range and includes targeted advertising messages.

DETAILED DESCRIPTION OF THE INVENTION

In the following description, numerous specific details are set forth in order to provide a more thorough description of the present invention. It will be apparent, however, to one skilled in the art, that the present invention may be practiced without these specific details. In some instances, well-known features may have not been described in detail so as not to obscure the invention.

One or more embodiments of the invention comprise at least one method and system for managing admission to an attraction. The system is particularly applicable for use in an environment where the number of customers which desire access to an attraction is greater, at one or more times, than the capacity of the attraction. Such a condition may be referred to as a condition of insufficient capacity. By insufficient capacity, it is meant that fewer customers can be accommodated at/by the attraction than wish to be accommodated at a particular time or over a period of time. This condition may arise by an imposed limitation, such as where it is desired to limit the number of persons in a particular area at a given time. Such may be for safety or a variety of other purposes. This condition may also arise due to physical limitations, such as the number of seats on a particular ride and the cycle time of the ride.

Figure 1:
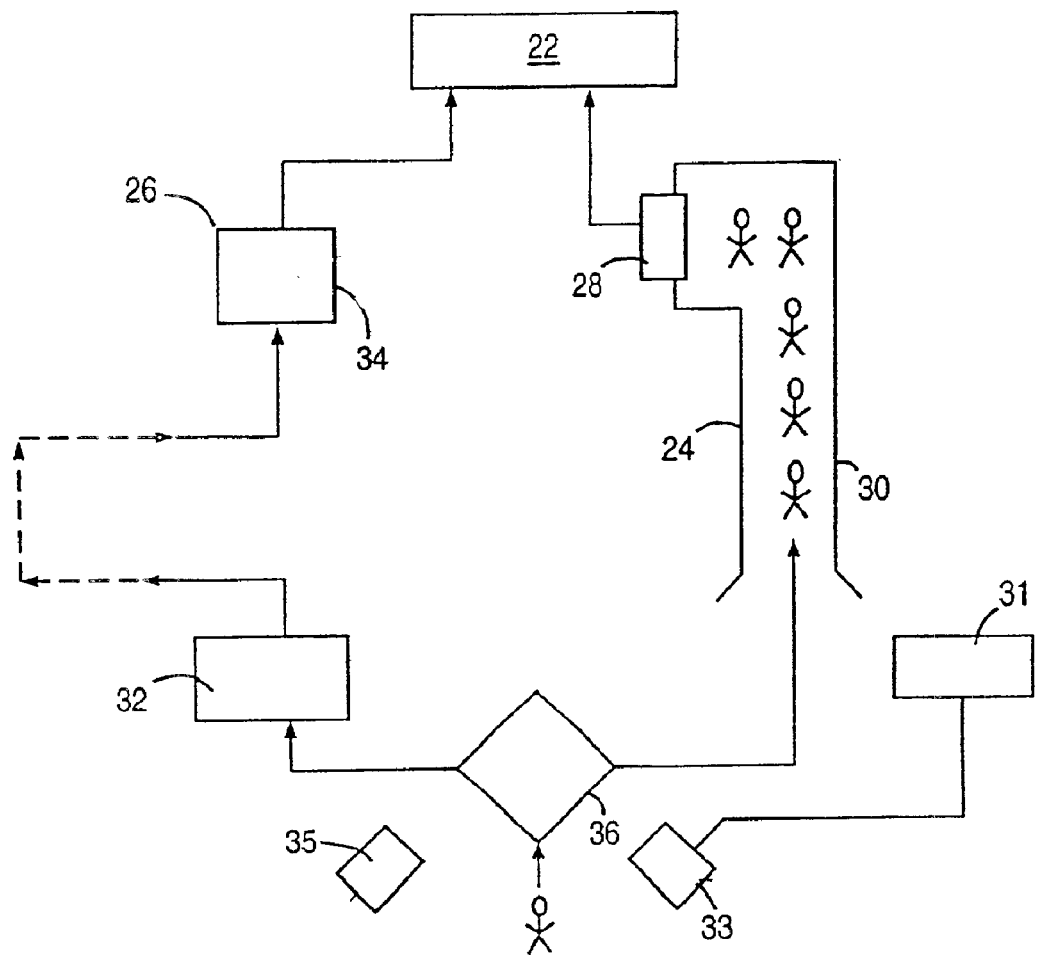
FIG. 1 is a schematic overview of an attraction admission management system in accordance with an embodiment of the invention for managing admission to a single attraction.

FIG. 1 is an illustration of one embodiment of the present invention. The system is for use in controlling admission or entry to an attraction 22 (note, as used herein, the term "attraction" is meant to comprise any location or presentation to which one or more customers wish to gain access. The attraction may comprise a location at which a service is provided, such as a ride, stage or other show, theater, parade, restaurant or other food service, merchandise location, transportation or the like. The attraction may also comprise a geographic location, such as a natural wonder, art museum or the like. Thus, while the system has particular applicability to and is described herein for use in controlling access to a ride-type attraction, the system may be used in a wide variety of other environments where it is desired to avoid lines).

In one or more embodiments, the system includes a first queue 24 by which customers gain access to the attraction 22 by waiting in a line, much as has been done in the prior art. In other words, the customers in the first queue 24 have an order in line based on a time at which they enter the queue, and are able to utilize the attraction in that order when a space or capability is available. In one or more embodiments, the queue 24 includes a turnstile 28 (or similar device for controlling access) positioned at an entrance of the attraction 22. The queue 24 may also include ropes, fences 30 or the like for defining a space in which the customers line up.

In one or more embodiments, the customers in the first queue 24 are permitted to access the attraction when there is an open spot not filled by the customers accessing the attraction via the second queue 26. As described in more detail below, the number of customers which are permitted to access the attraction via the second queue 26 may be adjusted to provide a certain number of open spots for customers in the first queue 24. For example, 80% of the available spots for the attraction may be dedicated to and filled by customers from the second queue 26, while the remaining 20% are filled by customers from the first queue 24. In addition, if one or more of the spots dedicated to the customers of the second queue 26 are not filled, such as if one or more customers who obtain passes for accessing the second queue 26 do not return to access the attraction, then these spots may be filled by customers in the first queue 24. As described in more detail below, this arrangement permits the attraction to operate at all times at optimum capacity.

The system of the invention also includes a second queue 26 by which customers gain access to the attraction 22 without waiting in a line and thereby avoid the first queue 24. In one or more embodiments of the system, the system includes at least one validator for validating the right of a customer to receive an assigned time to access the attraction via the second queue.

In the embodiment illustrated in Figure h, the system includes a first validator 32 validating the right of a customer to receive an assigned future time to utilize the second queue 26, and a second validator 34 for permitting the customer to access the attraction 22 at a future time via the second queue 26. In this manner, the customer can avoid the first queue 24.

In operation, a customer utilizes the first validator 32 to obtain an assigned time in the future for accessing the attraction via the second queue 26. As described below, in one embodiment, an entitled or "validated" customer may be issued a pass which includes a time or time range at which the customer is entitled to return and utilize the attraction. The amount of time between the time a pass is issued and the time at which the customer can utilize the attraction depends on a number of factors, including the number of people who have already obtained passes, the capacity of the attraction, the operating speed of the attraction, staffing availability, the capacity of the attraction allocated to the customers accessing it via the second queue, and any delays related to operation of the traction.

When the assigned time or time range (such as that indicated on the pass) occurs, the customer is entitled to access the attraction without waiting in line. The customer accesses the second queue 26 and establishes entitlement to access the attraction via the second queue 26. In one embodiment, the customer presents the issued pass at second validator 34 and if the pass is valid (i.e., the time or time range is appropriate, the pass is not counterfeit, etc.) the customer is admitted to the attraction.

In one embodiment of the invention, a customer may only use the second queue when the customer has not previously been issued a yet unused or unexpired pass. This scheme is to prevent customers from obtaining multiple passes for a single attraction, preventing others from enjoying it, or to prevent customers from reserving admittance to multiple attractions. A customer may be permitted to obtain multiple passes to one or more attractions, as described in greater detail below.

As illustrated in FIG. 1, at or near an entrance to attraction 22, a customer is presented with a point of decision 36 where the customer decides whether to access the attraction 22 via the first queue 24 or the second queue 26. When there is no appreciable line in the first queue 24, the customer may decide to forego the second queue and utilize the attraction in a prior art manner. If the line in queue 24 is too long, or if the customer wishes to utilize the system of the invention, the customer chooses the second queue 26.

In one or more embodiments, the system includes a first queue wait time generator 31 and associated display 33. The first queue wait time generator 31 is configured to generate a time regarding the wait associated with accessing the attraction via the first queue 24 by a customer about to enter the first queue 24. Of course, the wait time may be calculated manually, such as by tracking the wait time of one or more particular customers through the first queue 24 from time of entry until time of attraction access. In one or more embodiments, the first queue wait time generator 31 includes sensors which provide data for use by the generator 31 in determining a current length of the wait associated with that line. The sensors may provide information such as the physical length of the line. The generator 31 may use this information and information such as the current ride capacity, percentage of capacity allocated to customers accessing via the second queue 26, and other factors for generating an approximate first queue wait time. Various data for use by the generator 31 may be input manually as well. For example, a ride operator may visually estimate the physical length of a line and input line length data to the generator 31. The first queue wait time display 33 is configured to provide a customer at the point of decision 36 with the first queue wait time information. The display 33 may comprise a digital or other display for displaying hours and/or minutes of wait time.

In one or more embodiments, the system includes a second queue time display 35. This display 35 is configured to display the next time which will be assigned to a customer for accessing the attraction through the second queue 26. The display 35 may comprise a digital or other display displaying hours and/or minutes of wait time.

Using the information regarding the access times available to a customer via the displays 33,35, a customer is aided in the process of deciding to access the attraction through the first or second queues 24,26.

In one or more embodiments, the first validator 32 for verifying entitlement of a customer to an assigned future time may be located remote from the attraction or there may be more than one first validator 32, one located near the attraction and one or more located remote therefrom. For example, a first validator 32 may be located near an entrance to a theme park. In such an event, a display 33 for displaying first queue waiting time and a display 35 for displaying the next available time for accessing the attraction via the second queue 26 may be located at the remote first validator 32 as well.

Figure 2:
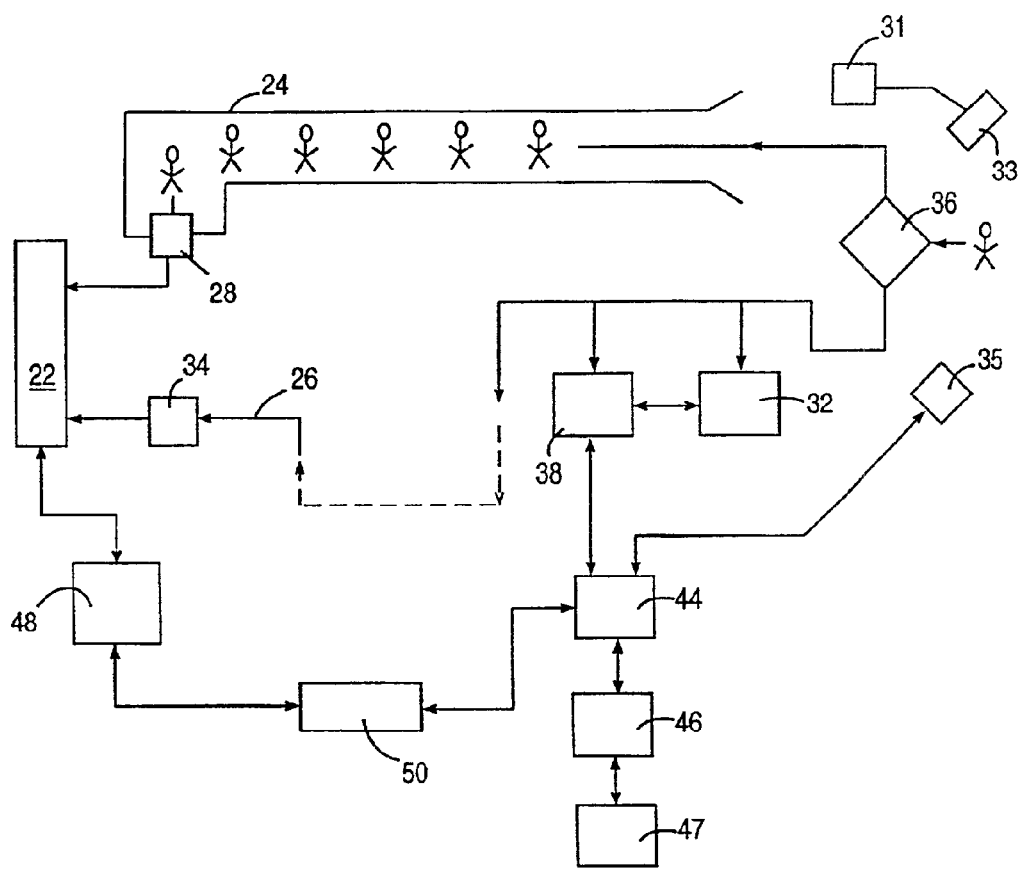
FIG. 2 illustrates in more detail a system such as that illustrated in FIG. 1.

FIG. 2 illustrates one embodiment of a system having a first validator 32, a media distributor 38, and a second queue 26 having an associated second validator 34. The first validator 32 is arranged to determine or verify that a customer is entitled to an assigned future time for accessing the attraction via the second queue 26. In one embodiment, the first validator 32 establishes the right of a customer to a pass having an assigned future time, the pass for use by the customer in gaining access to the attraction 22 via the second queue 26 at the future time. The first validator 32 may comprise a card-reader type device which is arranged to read a magnetic stripe on a ticket issued to the customer. In such an arrangement, each customer may be provided with a ticket or similar element which establishes a customer's right to access the attraction 22.

In an embodiment where the attraction 22 is inside of or part of a theme park, the ticket which the customer uses for validation may be a ticket which is issued to the customer by which the customer gains access to the park itself. In such an arrangement, the first validator 32 may be arranged to communicate with a main database containing information regarding the customer(s) (such as by ticket numbers) which are entitled to utilize the second queue 26.

In one or more other embodiments, the first validator 32 may be arranged to read information on a card, to accept issued tokens, identify one or more biometric identifiers of a customer such as a radio-frequency identification (RFID); retina, voice, thermal, finger or hand geometry signature; or a visual identification of the customer or the like.

In one or more embodiments, if the first validator 32 establishes the right of the customer to an assigned time in the future for accessing the attraction via the second queue 26, then the media distributor 38 distributes a pass to a customer which the customer may utilize to access the attraction via the second queue 26. In one embodiment, the media distributor 38 comprises a printer which prints a paper pass or similar element. The media distributor 38 may issue one or more of a wide variety of media as passes, such as magnetic-stripe encoded or "smart" cards, punch-type cards, coded tokens, biometric identifiers such as those set forth above and the like.

In one embodiment, the pass which is distributed to each customer by the media distributor 38 is arranged to permit the customer to gain access to the attraction 22 at a time in the future. The particular time, as described below, may vary upon a wide variety of circumstances. In one or more embodiments, the time comprises an assigned access time or time range which is printed on the pass which is issued to an entitled customer. (In the examples below, the pass is referred to as having a "time" associated with it. It will be understood that this contemplates both a specific time and/or a time range, time period, or time window).

As described above, the first validator 32 and the media distributor 38 may be located adjacent to the attraction and/or remote therefrom. In the event the first validator 32 and media distributor 38 are located near the attraction, after obtaining a pass or the like, the customer may leave the area of the attraction 22 and need not return to the attraction 22 until the time provided on the pass. In the event the customer obtains a pass from a remote media distributor 38, the customer simply continues about their activities until it is necessary to travel to the vicinity of the attraction at the assigned time. As described in more detail below, the right of a customer to obtain passes may be a value added feature for which the customer pays additional monies (such as at the same time as purchasing a main ticket).

In one or more embodiments, the first validator 32 may be integral with a main ticket issuer/validator and second queue access passes may be issued at the same time or as part of a main ticket. For example, a customer entering a theme park may be permitted, at the time they present or purchase their ticket, to obtain one or more passes providing future times assigned by the system. This permits a customer to plan or schedule their day ahead of time. In this arrangement, the ticket which the customer uses to access the theme park may be encoded and/or printed with access time information for permitting the customer to access one or more attractions at future times, avoiding the need to issue separate passes.

In one or more embodiments, the system and method for permitting access to the attraction 22 includes a second validator 42 for establishing the right of a customer to access the attraction via the second queue 26 at assigned time. In one embodiment, the second validator 42 validates the media or pass issued by the media distributor 38 and held by a customer. In one or more embodiments, the second validator 42 comprises a human attendant which reads information printed on the pass and verifies the information. The attendant may verify the printed assigned time or time range against the current time, a date of the pass against a current date, and the attraction for which the pass is issued.

Alternatively, the second validator 42 may comprise a card reader or other device for confirming the entitlement of a customer to access the attraction 22 via the second queue 26. For example, the second validator 42 may be arranged to verify data associated with the element issued by the media distributor 38, such as a bar code.

In one or more embodiments of the invention, the pass issued to a customer may be issued only for reference by the customer for knowing and remembering the assigned time or range of time, and the second validator 34 may be configured to verify entitlement of the customer in a manner independent of the pass. For example, a customer may establish entitlement to a pass with a finger print at the first validator 32. The pass provides written indication of the assigned time to the customer. When the customer accesses the second queue 26, the customer may be required to establish validation at the second validator 34 with a fingerprint again. In this arrangement, the second validator 34 determines that the customer is entitled to access the attraction by establishing that the identify of the customer with the fingerprint and determining if the time the customer is accessing the second queue 26 is at the time/in the range of time which was assigned to the customer. It may be appreciated that the second validator 34 may be configured to establish validation in one or more of the variety of manners described above with respect to the first validator 32. It should be appreciated that customers may not be issued passes at all.

In accordance with one or more embodiments of the invention, one or more schemes are provided for determining the access time which is associated with each media which is issued by the media distributor 38. In one or more embodiments of the invention, a time at which a customer is permitted to gain access to the attraction 22 via the second queue 26 is dependent upon one or more of a variety of factors, including, but not limited to, the following: the capacity of the attraction, the capacity of the attraction which is allocated to customers accessing through the second queue 26, the total number of customers who may wish to access the attraction 22, the current and future staffing of the attraction, the demographics of the customers, the time of day and the day of the week.

In one or more embodiments, the system includes a controller 44. As illustrated, the controller 44 is arranged to control the media distributor 38. The controller 44 may also be arranged to control other aspects of the system, such as the first validator 40. In one or more embodiments, the controller 44 receives attraction capacity and/or time information and instructs the media distributor 38 what time to issue in association with each pass. The controller 44 may send a signal to the second queue time display 35 for displaying the next time to be assigned.

A keypad 46 or other data entry/control device (such as a keyboard, mouse, joystick or the like) may be provided for manually entering data and controlling the controller 44. The keypad 46 may be used to enter specific time information, reset the controller and the like. A display screen 47 such as a CRT may be associated with the controller 44 and keypad 46 for permitting a user to view information regarding the system.

A local server 48 is arranged to send and receive data. In one or more embodiments, the local server 48 is arranged to receive data about the capacity and other characteristics of the attraction 22. For example, various sensors may be associated with the attraction 22 for providing data. In one or more embodiments, the sensors (not shown) may monitor ride speed, the number of customers passing through or standing in the first queue 24, the capacity of the ride, etc. The local server 48 may receive data from these sensors at various times or continuously, or may transmit specific requests for data. (In other embodiments, the local server 48 may be a remote server in communication with the attraction and sensors).

Information may be inputted manually or automatically. For example, each staff member which is currently available to operate a ride may manually enter their employee code to indicate to the system that they are available to operate the system. Based on the number of employees which are indicated as available, adjustments may be made to the number of customers which are likely to be serviced during a period of time.

As will be appreciated by those of skill in the art, many current attractions, such as thrill rides, already include sophisticated ride control systems. These systems have a variety of sensors and controls for monitoring and controlling the ride. The local server 48 may simply comprise an interface with the individual ride control systems for receiving information therefrom.

The information which is provided to the server 48 is transmitted to an algorithm processor 50. The algorithm processor 50 utilizes the data to determine times for issuance by the media distributor 38. In general, it is desired that the algorithm processor 50 issue a time associated with each media which permits the customer to return to the attraction 22 at the predetermined time at the second media validator 42 and access the attraction 22 (such as via second validator 42) without standing in a line. In order to accurately balance demand and capacity, the algorithm processor 50 obtains information regarding a variety of factors which affect demand and capacity. (Although shown as separate entities in FIG. 2, the controller 44 and algorithm processor 50 may be implemented as a single device or process).

In one or more embodiments, if the wait associated with the first queue 24 becomes longer than a desirable time, then the algorithm processor 50 may be arranged to issue fewer numbers of access times or access times which are later in time so as to permit a greater number of customers from the first queue 24 to access the attraction 22 for a period of time. In the event the capacity of the attraction 22 suddenly decreases, the algorithm processor 50 may be arranged to respond in a similar fashion. In the event the capacity of the attraction 22 increases, then the algorithm processor 50 may be arranged to issue a greater number of access times.

Figure 4:
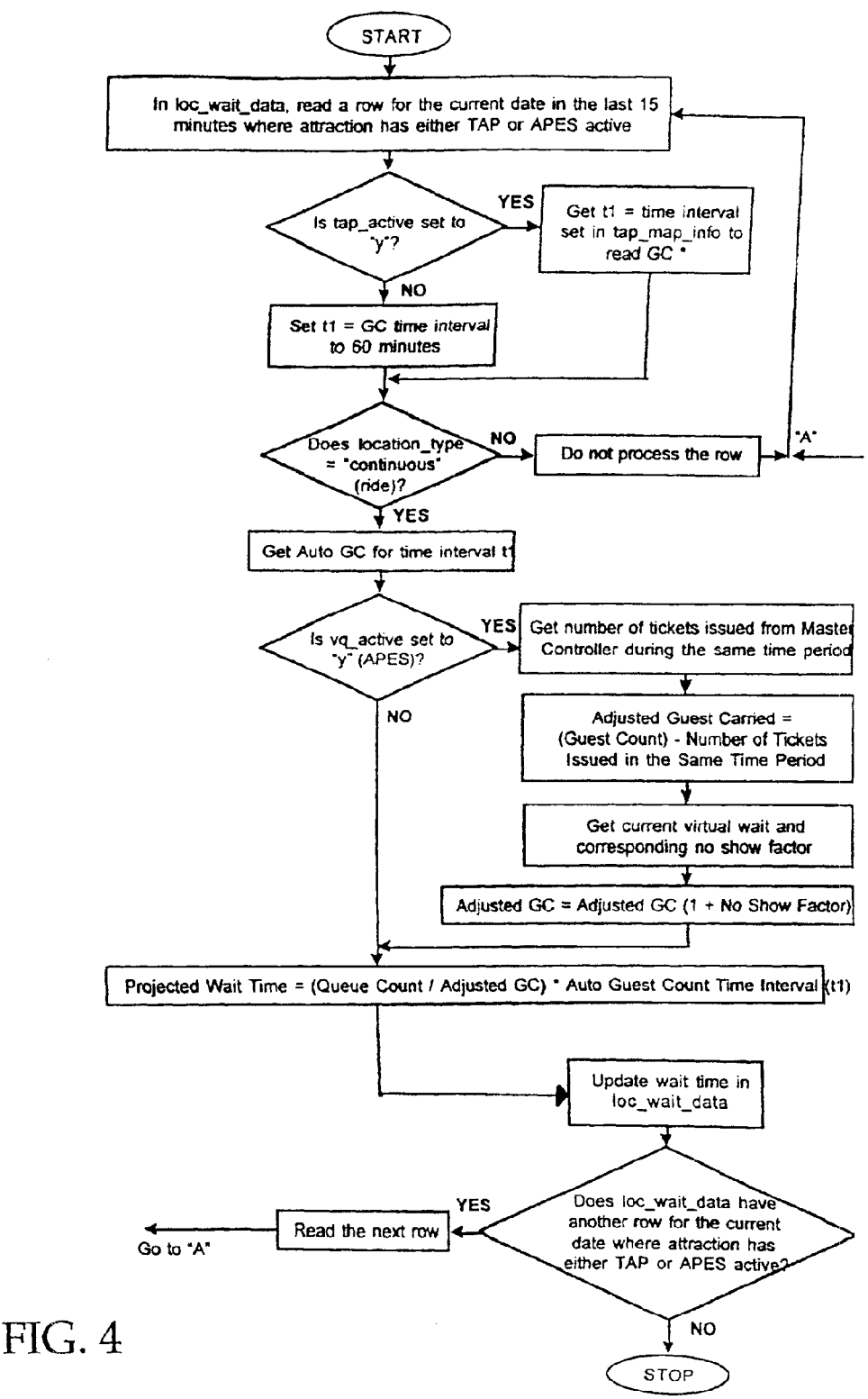
FIG. 4 is a flow diagram of an access time calculation method in accordance with an embodiment of the invention.

In one or more embodiments, the algorithm processor 50 utilizes one or more algorithms to produce access time data. Set forth in FIG. 4 is a flow diagram illustrating a configuration of a method by which the assigned or "wait" times are calculated (as used in FIG. 4, "GC" represents the guest count). FIGS. 5A–5H illustrate tables and a data dictionary for data element which may be used in the illustrated wait time calculation.

Set forth below is information regarding a number of processes employed in the flow diagram illustrated in FIG. 4. As set forth therein, the system may be arranged to employ a number of procedures at different times. For example, every 5 minutes, the system is arranged so that data associated with the controller 44 is uploaded to a master server (as described below in conjunction with FIG. 3). The system may be arranged so that all data regarding customers which have been issued entitlements is cleared from the system at 3 a.m. each day.

Dispense Rate Calculation
g=number of guests carried
x=guest count survey time in minutes
z=percentage of capacity for attraction sent to the system
p=ticket increment period in minutes
((g*z)/x)*p=dispense rate setting

EXAMPLE

If g=2,000, x=60, z=0.8, p=5, then
((2000*0.8)1 60*5=133.33
Rounded down to 133.

Processes

The system has following processes:

5-Minute Load Process

Every 5 minutes, a main systems process on a Bridge server will get the Master Controller data (as used herein and in the Figures, "master controller" includes controller 44 as described above and a master controller 244 as described below), call the stored procedure "put_me_data" on the Park server (the Park server may comprise a server such as server 104 described below with reference to FIG. 3), and pass a series of values to the stored procedure. The stored procedure will insert these values into the synonymed "vq_contr_feed_info" table, which points back up to an attraction data server (such as the master server 102 as illustrated in FIG. 4 and referred to in FIGS. 5A–5H as "OPSheet" or local server 48), and update the local Park server table "vq_last_feed_info".

10-Minute Send Process

Every 5–10 minutes, after calculations have been performed to determine the correct dispense rate, a row will be inserted into the vq_opsheet_feed table location on the attraction data server. This insert will trigger a stored procedure, which will activate a C routine. The C routine will build two files. The first file will contain the attraction identifier; the second file will contain k-shell script commands. The C routine will execute the k-shell file, and the k-shell file will ftp the first file to the Bridge server location.

On the Bridge server, another mechanism will run every minute looking for the file sent by the process described above. If the file is found, a message pulse will be sent via the Windows NT operating system to activate the main systems process.

The main systems process will read the file to get the attraction ID. Using this attraction ID, the main systems process will call the stored procedure "get_me_data", located on the attraction data server. This stored procedure will return the values from the "vq_opsheet_feed_info" table for the attraction in question, and then indicate that this data has been processed.

Abuse Check

When a card is read through the magnetic reader, a main systems process will trap the information, attach the attraction, and call a stored procedure called "abuse_check", which is located on the Park server. This stored procedure will determine whether or not a duplicate ticket exists for abuse purposes. It will also determine whether or not the close time has been reached. Based on several checks, either a 0 (successful), 1 (abuse), or 2 (past the close time) will be returned by the stored procedure to the main systems process. The main systems process will then determine how to proceed with printing a reservation ticket.

Clearing Abuse Check Data

Each morning at 3:00 AM, a process called "cleanab.sh" will run. This is a C program that will delete all the abuse check data accumulated for the day.

Synchronization of Attraction Data Server to the Park Servers

Each time an attraction is created, updated, or deleted in the attraction data server, a trigger mechanism will be activated. The trigger mechanism will take the changes on the attraction data server and pass them to the correct Park server attraction table. This will be done via a stored procedure called "synclocs". This stored procedure will determine which park needs to be updated and, via a synonym, perform the updates.

Network Monitoring Mechanism

This process will be comprised of a C routine residing on the attraction data server. This C routine will be activated every minute, and will build a connection against the attraction data server database and each of the active Park server databases. It will also attempt ping against each of the active Bridge servers. If any component fails, a page will be sent to the development team.

Visual Basic Turnstile Feed to Attraction Data Server

A Visual Basic process will run on a dedicated Windows NT server to keep the data flowing into the attraction data server.

Down Time Process

The Down Time Process is used when a location must be closed to guests for a certain amount of time.

A user at the location initiates this process through the attraction data server's line management module, which displays on the location's PC. In the Location Down Time screen, the user selects the appropriate park and location.

The process checks to see if the selected location is in Override mode.

- If the location is in Override mode, the process prevents the user from continuing. (A down time cannot be assigned to a location in Overridemode.)
- If the location is not in Override mode, a location port ID is retrieved. This location port ID is used throughout the process to assign values to tables pertaining to the location's down time status. After the park and location are selected, the process provides a suggested "expected up time." The suggested expected up time is the current time+the default minimum down time. (Each location has a default minimum down time.) The user can modify the expected up time so it is greater than the suggested expected up time, but cannot modify it to be less than the suggested time.

The process obtains the expected up time from the user and the current time from the UNIX server.

Next, the process obtains the down time minutes by subtracting the current time from the expected up time.

The process obtains the guest window start and end time from either the controller feed table or the attraction data server feed table. (Obtaining the most up-to-date time is critical. If the guest window start value in the OPSheet feed table is greater than the guest window start value in the controller feed table, the values from the attraction data server feed table are used. Otherwise, the values from the controller feed table are used.)

The process checks to see if the location has previously been in down time mode. If the location has previously been in down time mode, the process does one of the following:

- If the current time is less than the location scenario table's expected up time (that is, the user is modifying an existing expected up time), the process updates the location scenario table.
- If the current time is greater than the location scenario table's expected up time (that is, the user is entering a new expected up time), the process inserts a row into the location scenario table and updates the table.

The process obtains the location scenario id number to insert into the attraction data server feed table.

If the location is not in down time mode, the process checks to see if the location is in schedule mode. If the location is in schedule mode, the schedule's performance values are assigned to the appropriate tables via the location port ID.

If the location is not in either schedule or downtime mode, the process uses the values in the location's bc_port_info_ data table.

When the locations values have been assigned to the appropriate tables, the process runs a stored procedure that calculates the new dispense rate using values obtained from the location port id.

Finally, when the location scenario id is obtained, a row is inserted into the attraction data server feed table with values provided by the user, the stored procedure and the supporting tables.

The algorithm processor 50 and controller 44 work with one another to control the issuance of passes by the media distributor 38. In general, the access times that are provided by the algorithm processor 50 are forwarded to the controller 44. The access times are then provided sequentially to the media distributor 38 for printing on each successive pass. In the event the algorithm processor 50 indicates that no more access times are available, the controller 44 may instruct the media distributor 38 and/or first validator 40 to print or display a message that no more customers are being provided access to the attraction 22 via the second queue 26.

The algorithm processor 50 may be arranged to provide for multiples of the same access time. For example, if the capacity of the attraction 22 permits, two or more passes may be issued with the same access time. On the other hand, if the capacity of the attraction 22 is limited, the access times may be spaced apart in time.

Figure 6:
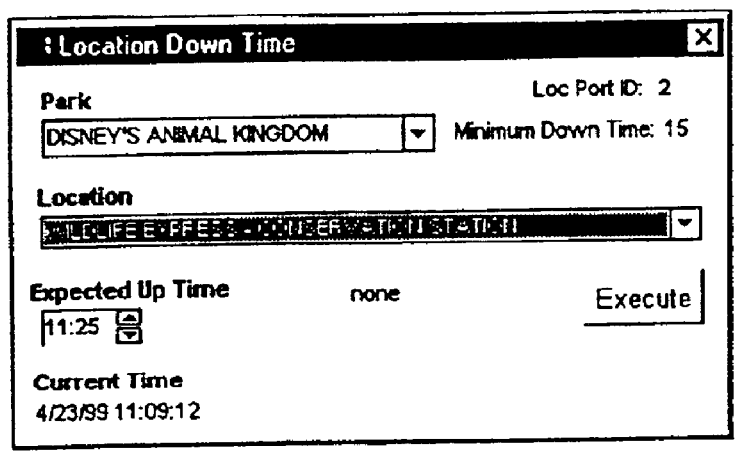
FIG. 6 illustrates an embodiment of a viewable screen which provides a user of a system of the invention with attraction "downtime" information.

As described above, certain information regarding the system may be provided for viewing on the display screen 47. The display screen 47 and associated keypad 46 may comprise a user interface for the system for obtaining information from and inputting information to, the system. FIG. 6 illustrates an information screen illustrating the current "downtime" of an attraction. A user of the system may input estimated downtime information to the system using the keypad 46. This information may be used by the algorithm processor 50 to adjust the times which are being calculated for assignment to customers by the input time.

Figure 7A:
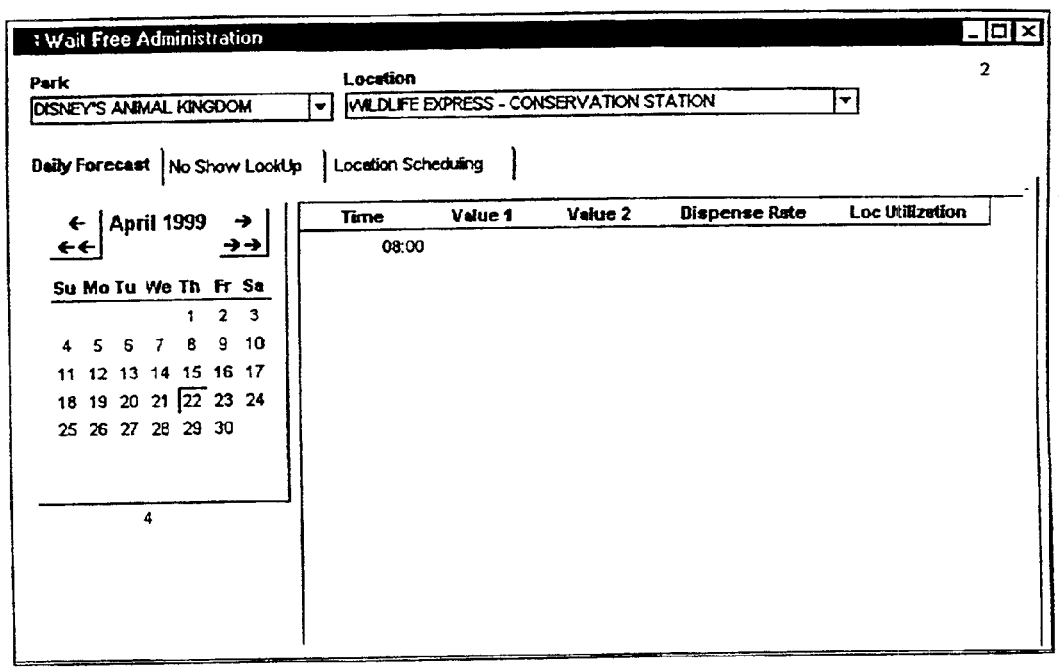

FIGS. 7A–7C illustrate screens which permit a user to view current system settings and adjust those settings. For example, a user of the system may determine from such a screen that the current pass dispense rates for the second queue 26 are higher than desired, and input a lower percentage allocation value to the system for reducing the number of passes/entitlement issued to customers. The user may also set an expected level of "no shows" or the percentage of customers who obtain passes for accessing the second queue but do not use them.

FIG. 8 illustrates a screen which enables a user to establish a variety of settings for a specific attraction. For example, using this displayed information a user can determine whether or not the system is configured to permit a customer to obtain multiple passes. If not (i.e. "abuse check" is "on"), the user may utilize the keypad 44 to change this setting, if desired. The user may also be permitted to view and adjust a wide variety of other information such as the time at which the ride will shut down and thus the last possible assigned time.

Figure 9:
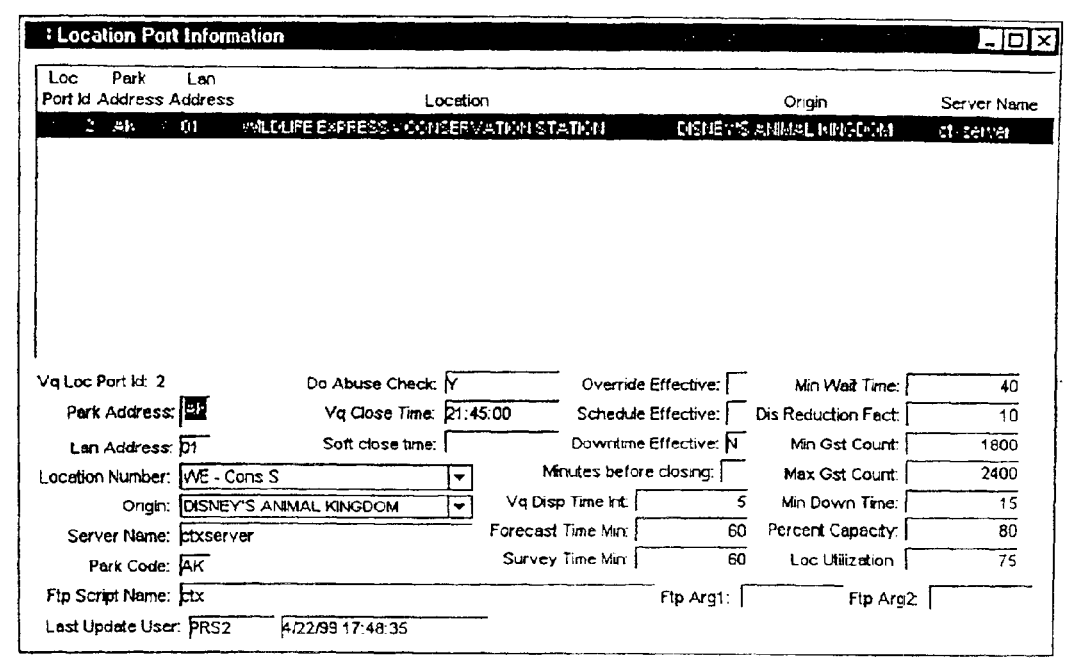

FIG. 9 illustrates a screen displaying information associated with the master server 102. As illustrated, using information provided to the master server 102, a user may obtain information regarding any one or more attractions associated with the system. The user may be permitted to obtain and revise information with any particular attraction. This arrangement allows a user to avoid the need to travel to each attraction to view information, but instead obtain and edit information from a central location.

The personnel which are permitted to access the system, including the viewing of information and inputting of information, may be limited. For example, a card-reader or similar device may be associated with the keypad 46 for reading an employee I.D. card and verifying that the employee is permitted to access the system.

Those of skill in the art will appreciate that there are numerous configurations of hardware and/or software for implementing the invention. For example, the controller 44, keypad 46 and display 47 may comprise components of a general purpose computer. The algorithm processor 50 may comprise hardware, or may comprise software executed in a processing environment, such as a computer.

Although the above-described system has been described as and is particularly applicable in managing admission to a single attraction, such a system can be adapted to manage admission to multiple attractions. In one or more embodiments, a first system which is associated with a first attraction 22 is linked to a second system associated with second attraction and/or additional attractions. FIG. 3 illustrates in greater detail such a master system 100 in accordance with one embodiment of the invention.

The master system 100 includes a master server 102 which is linked to a local server 48 of a local system associated with a particular attraction. In addition, a main server 104 is linked to each local server 48. For simplicity, FIG. 3 illustrates only one such local system in detail, and illustrates only the local servers of three additional local systems.

In the embodiment illustrated, the master server 102 serves the function of the algorithm processor 50 of the system described above. In this arrangement, the algorithm processor 50 associated with each system is omitted and the master server 102 serves the functions of each individual algorithm processor. The master server 102 sends calculated access time information for each attraction 22 to its respective local server 48, which then provides the data to the media distributor 38.

The main server 104 is arranged to permit communication to and between each of the local servers 48. For example, in one or more embodiments, when a customer seeks to obtain an admission pass for an attraction, the local server 48 associated with that attraction sends a request to the main server 104 to determine if the customer has already obtained an admission pass for another attraction. If so, the local server 48 can instruct the controller 44 (and first validator 40) to prevent the media distributor 38 from issuing an admission pass. When the customer is not prevented from obtaining an admission media, then the local server 48 may be arranged to send data to the main server 104 regarding the customer, the issued time and attraction so that the customer can be prevented from accessing another attraction at the same time or before the currently issued pass has been used or expired.

In one or more embodiments, the main server 104 stores or is linked to a database having information regarding customers entitled to access the second queue 26 of each local system to access an attraction. For example, the main server 104 may store ticket codes of those tickets issued to customers each day at an amusement park.

In one or more embodiments, when a customer wishes to access an attraction through the second queue and uses the first validator 40, the first validator 40 sends a request through the local server 48 to the main server 104 requesting verification that the customer is entitled to access the system. If the customer is verified, then such a response is transmitted to the first validator 40. If not, then such a response is transmitted to the first validator 40. The first validator 40 may be arranged to display an appropriate message to the customer, such as "invalid entitlement."

In accordance with one or more embodiments, there may be more than one "first queue" or other line in which customers wait. Further, in one or more embodiments, there may be no first queue. In such an arrangement, each customer who wishes to access the attraction is given an admission media (if so entitled) and permitted to access the attraction at the assigned time only.

Figure 10:
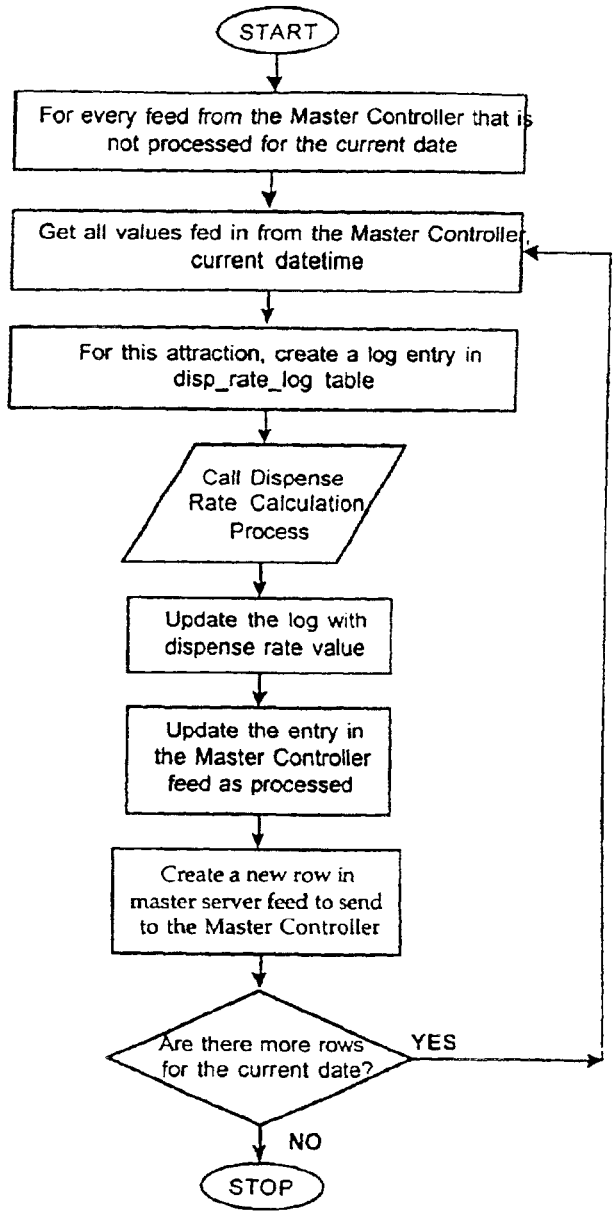
FIG. 10 is a flow diagram illustrating an embodiment of a method by which information is fed from a master server to a controller of an embodiment of the invention.
Figure 11A:
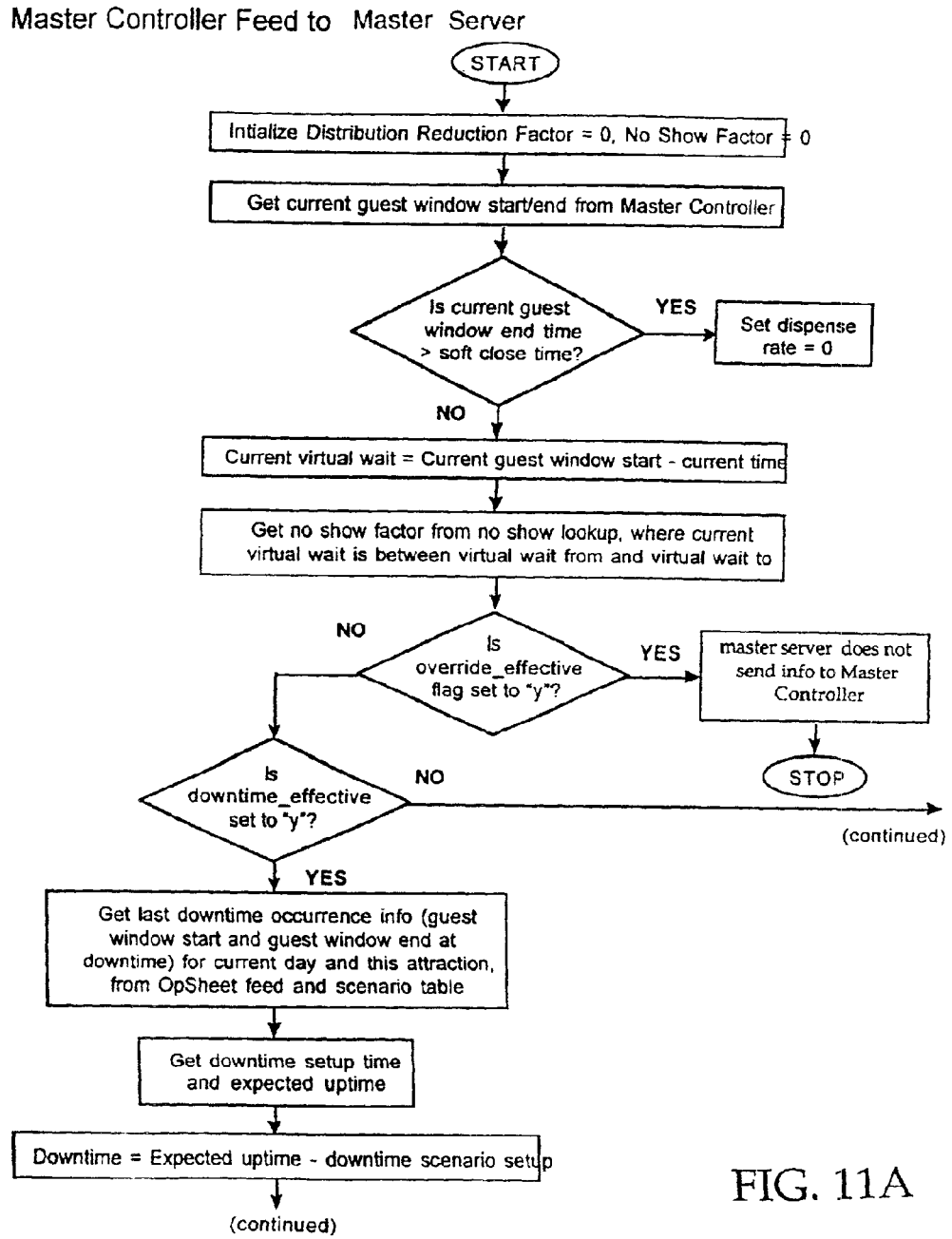
FIGS. 11A–11C show a flow diagram illustrating a method of the invention by which information is fed from a controller to a master server of an embodiment of the invention.
Figure 11B:
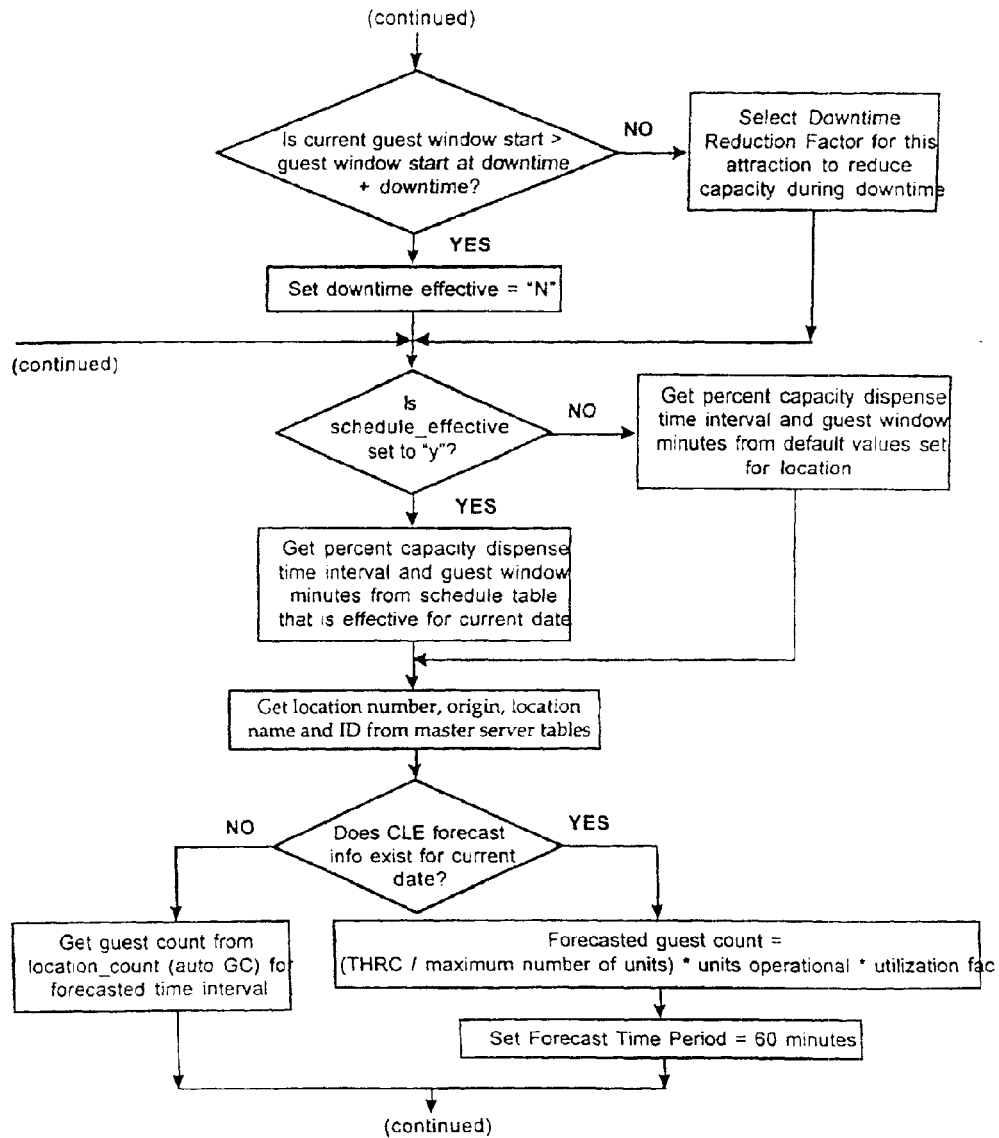
Figure 11C:
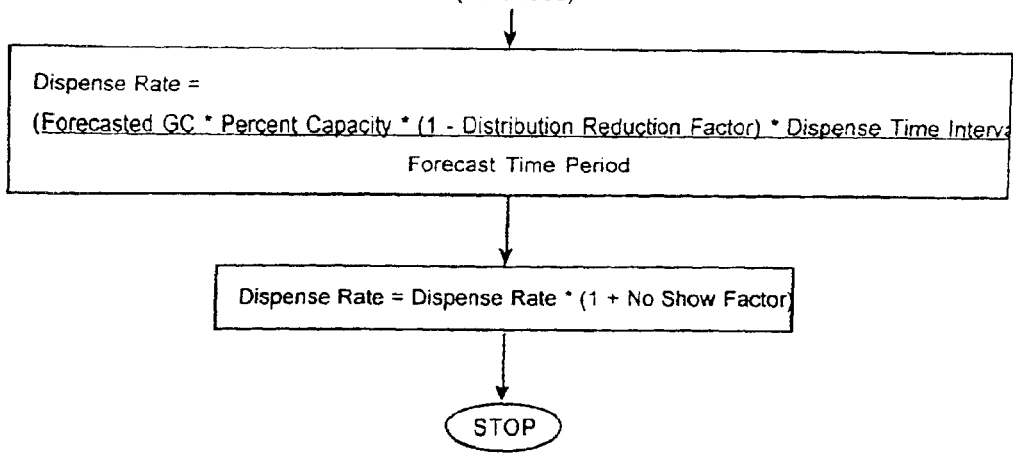

FIG. 10 is a flow diagram illustrating a protocol by which the master server 102 (referred to in the figure as the "Master Server Feed") communicates with the controller 44 of the system associated with each attraction in one implementation of an embodiment of the invention (this implementation is associated with the information provided in FIGS. 4 and 5A–5H and described further above). FIGS. 11A–11C show a flow diagram illustrating a protocol by which the controller 44 communicates with the master server 102.

Figure 3:
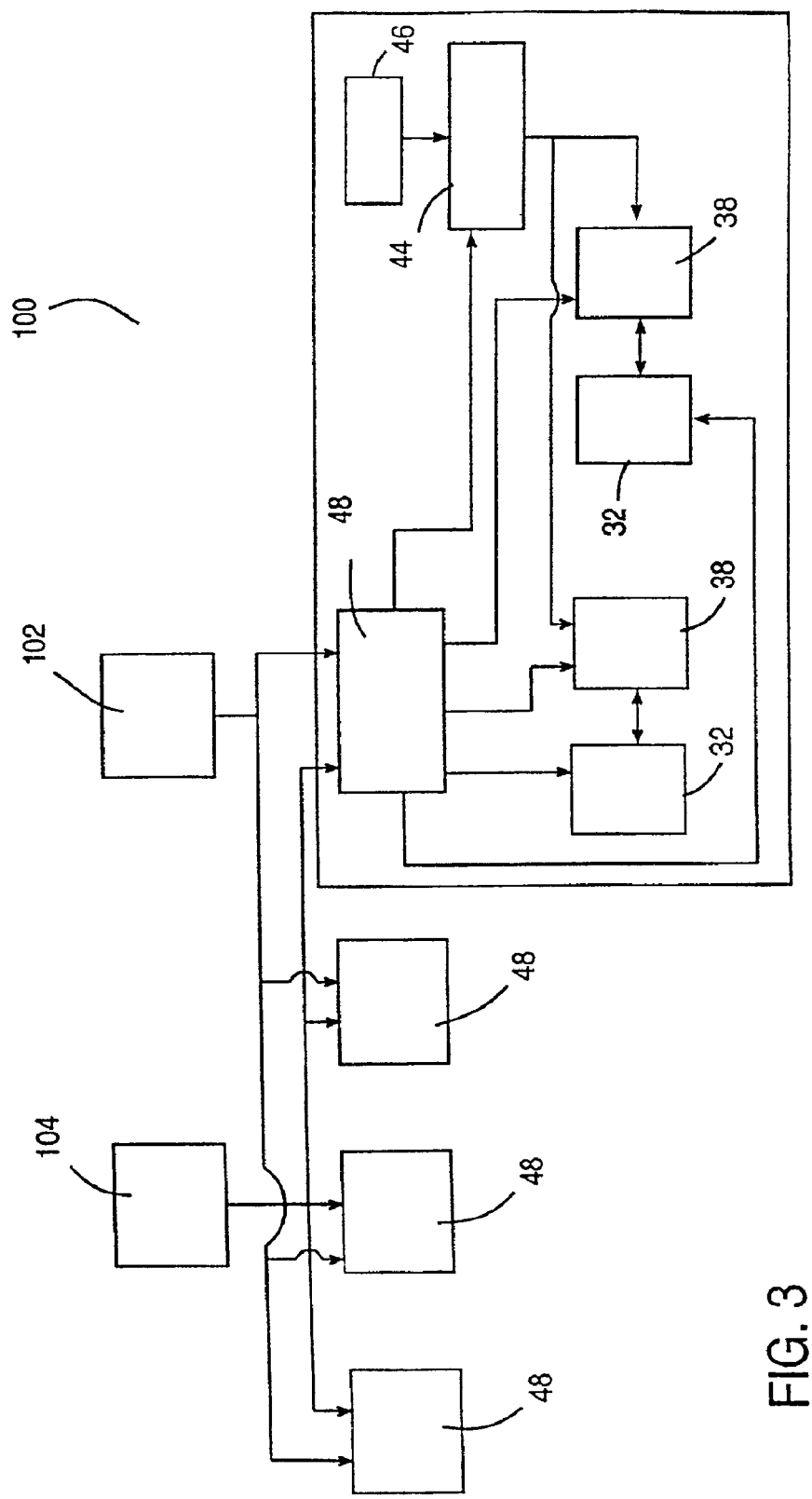
FIG. 3 illustrates a system of the present invention which includes multiple systems for managing admission to multiple attractions.

As illustrated in FIG. 3, more than one media distributor 38 and first validator 40 may be provided at each attraction 22. More than one second media validator may be provided for permitting access to the attraction 22.

Figure 12:
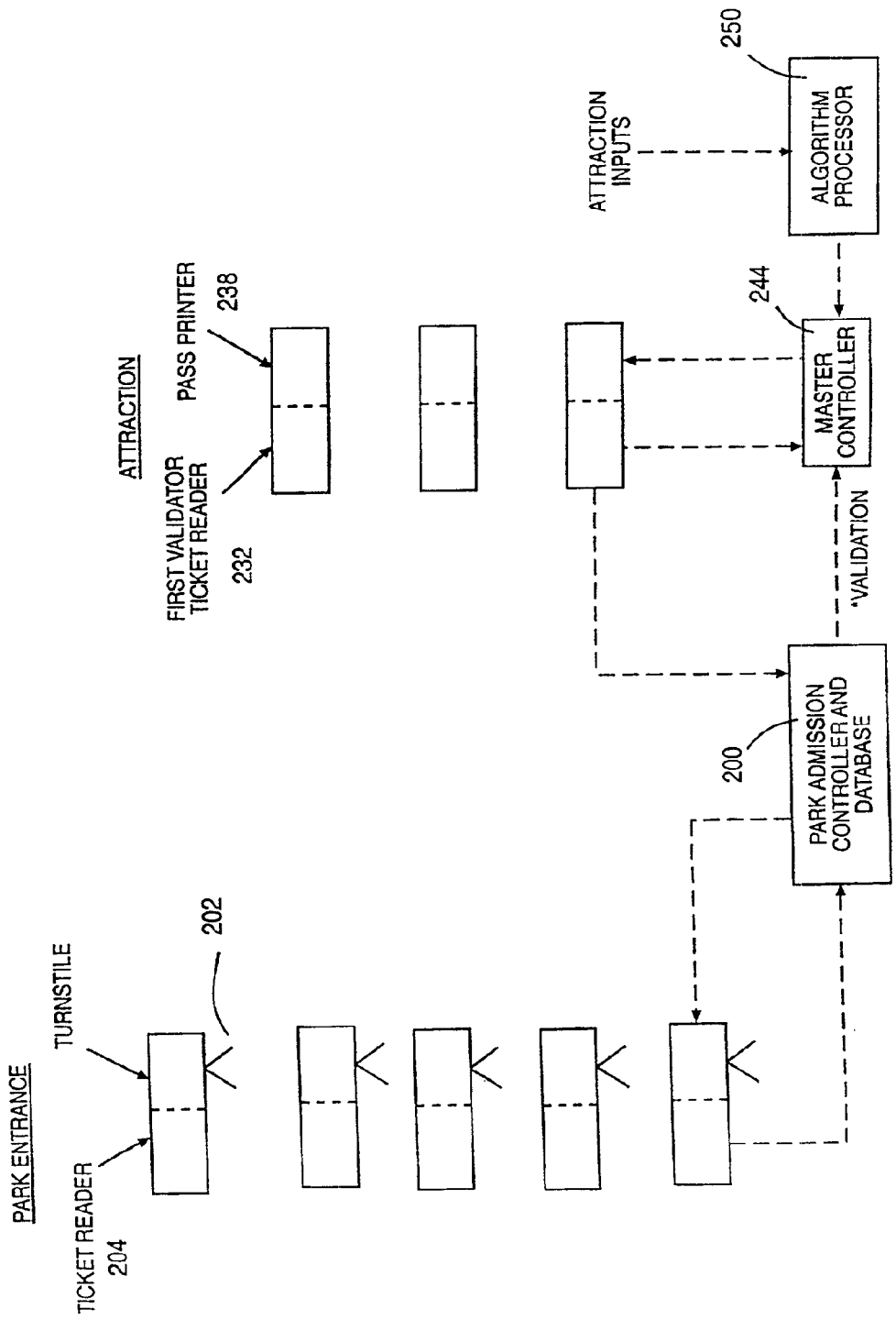
FIG. 12 illustrates a system in accordance with another embodiment of the invention.

FIG. 12 schematically illustrates a system in accordance with an embodiment of the invention in which validation of park entry tickets and establishment of the entitlement of a customer to access the second queue 26 is centralized. In this embodiment, a customer obtains a ticket, whether prepurchased or purchased at the gate. A central park admission controller and database 200 stores information regarding valid tickets. A customer is permitted to enter the park via a turnstile 202 or other monitored entry when the customer's ticket is validated. For example, the customer's ticket may be read by a ticket reader 204 and the data thereon verified by the park admission controller 200 against the stored ticket information.

When a customer wishes to obtain an assigned time to access a second queue of an attraction, the customer establishes an entitlement via a first validator 232. The first validator 232 communicates with the central park admission controller 200 via a master controller 244. This arrangement permits a determination that the customer's ticket is valid for a specific day, has not be revoked or the like. If the ticket is validated, then the customer may be provided a pass, such as described above, by a media distributor 238. The master controller 244 is also arranged to send data to the central park admission controller 200 that a pass has been issued to the customer for that attraction. Then, if the customer attempts to gain a pass for that or another attraction while the first pass is outstanding, the database associated with the park admission controller 200 has a record of the outstanding pass and the customer will be denied the additional pass.

Again, an algorithm processor 250 is arranged to communicate with the master controller 244 to provide times to be assigned and printed by the media distributor 238.

In one or more embodiments, the system may be arranged so that not all customers are entitled to access the attraction 22 via the second queue. In another embodiment, one or more customers may be permitted to access certain attractions via the second queue and other attractions only via the first queue. In one or more embodiments, only customers which pay a premium amount or obtain some special entitlement are permitted to access one or more attractions via the second queue.

Operation, Effect and Other Features

In operation, in one or more embodiments, a customer receives a ticket or other entitlement. For example, at an amusement park, a customer pays for a ticket to gain entry to the park. With respect to the embodiment of the invention illustrated in FIG. 3, the main server 104 stores information regarding the customer's ticket.

At some point a customer may wish to access a particular attraction 22. When the customer reaches the attraction, they are presented with an option. First, the customer may access the attraction through the traditional first queue 24. Optionally, the customer may access the attraction 22 via the second queue.

Figure 13:
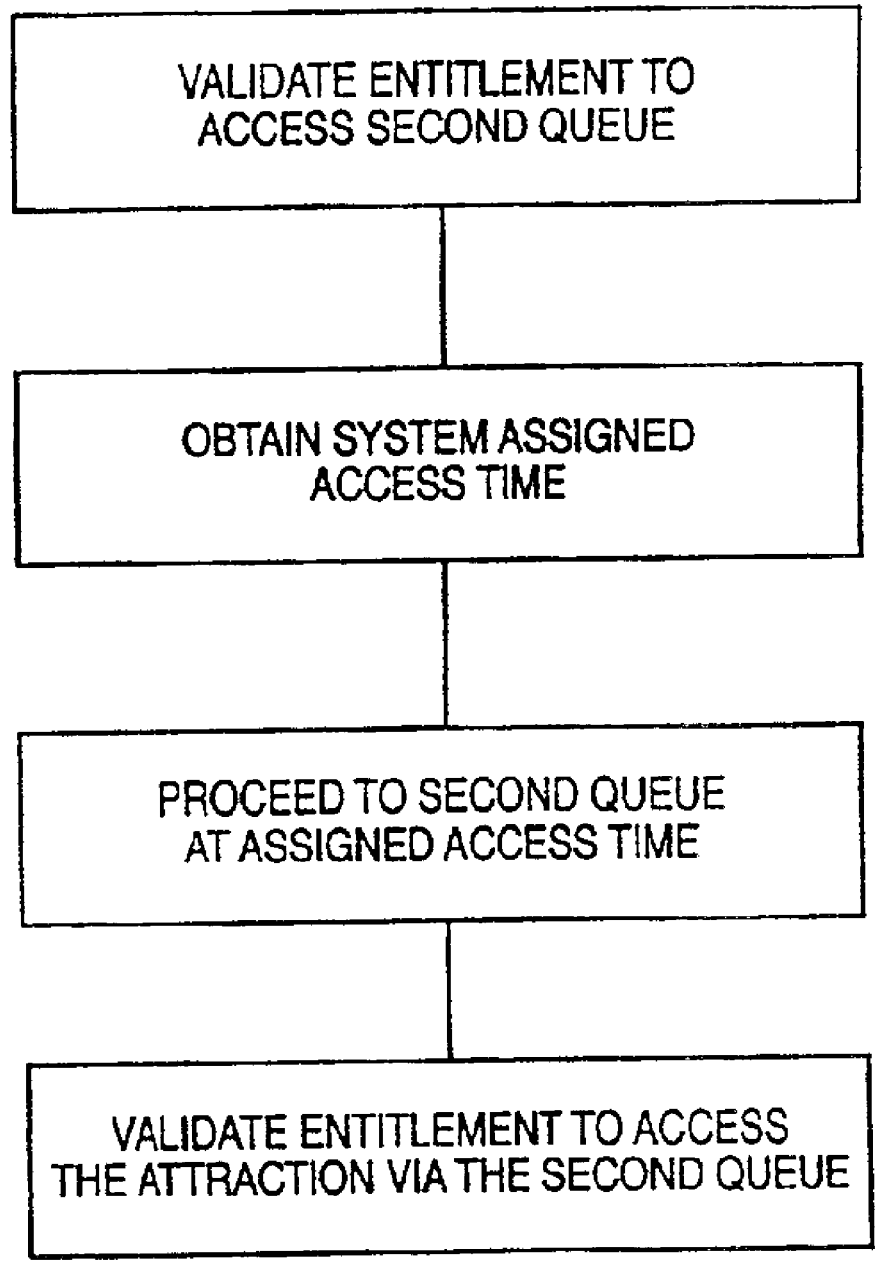
FIG. 13 is a flow diagram illustrating an embodiment of a method of the invention.

Referring to FIG. 13, if the customer wishes to access the attraction 22 via the second queue 26, the customer first validates entitlement to receive an assigned time to access the second queue 26. In one embodiment, the customer slides a portion of his ticket through a card reader portion of the first validator 40. In one or more other embodiments, validation may be performed by scanning a fingerprint or the like as described above.

In the arrangement illustrated in FIG. 3, the first validator 40 then sends a confirmation request through the local server 48 to the main server 104. The main server 104 verifies that the ticket is on the list of valid tickets. If the ticket is not verified, then the main server 104 sends this data back to the first validator 40 which may illuminate or print out an indication of such to the customer. In an embodiment where the customer is not entitled to more than one pass or entitlement to a second queue at a time, the first validator 40 is configured to verify that the customer has no other outstanding entitlements/passes.

In one embodiment, such as in the system illustrated in FIG. 2, if the ticket is verified, the first validator 40 sends a signal of such to the media distributor 38. The media distributor 38 then issues a pass to the customer. The pass includes an assigned access time at which the customer is entitled to return to the attraction 22 in the future and access the attraction 22 through the second queue 26.

The customer may then leave the area of the attraction 22. During this time, the customer may shop, eat or engage in a wide variety of other activities.

At the appointed time, the customer returns to the attraction 22 and seeks access to the attraction via the second queue 26. The customer establishes entitlement to access the attraction via the second validator 42. In the embodiment where the customer is provided with a pass which provides access, the customer presents the issued pass to a person who verifies the current time and the time printed on the pass, the date of the pass and the attraction for which the pass provides access. If validated, then the customer is permitted to access the attraction 22. As provided above, the customer may establish entitlement to access the attraction in accordance with other methods, such as by scanning a fingerprint again.

In one or more embodiments, the customers gaining access to the attraction through the first and second queues may be separated. For example, for a ride having four cars, the first two cars may be filled with customers from the first queue 24 and the second two cars filled with customers from the second queue 26. In one or more embodiments, the customers gaining access to the attraction 22 are integrated in accordance with the allocated capacity to the first and second queue customers.

In one or more embodiments, one or more customers may be permitted to access an attraction via the second queue 26 apart from the standard method of establishing entitlement at the first validator 40 and then returning to the second queue 26 of the attraction at the assigned time. For example, one or more passes may be issued to a number of customers which include pre-assigned times. One or more customers might, for example, be issued passes on the same day or days or weeks before the assigned date of access. A customer arranging a trip to a theme park may be permitted to purchase passes. In one or more embodiments, these assigned "spots" are accounted for by the system when determining other passes to issue to those accessing the attraction with the first validator.

In one or more embodiments, one or more customers may be permitted to access an attraction via the second queue 26 or even a third queue without a pass. For example, special VIP, disabled or other customers may be permitted to access the attraction via the second queue 26 or a third queue which permits the customer to access the attraction at any time.

As described above, in one or more embodiments of the system and method a customer is prevented from obtaining more than one entitlement or pass for accessing an attraction at a single time. In another arrangement, some customers may be permitted to obtain multiple passes. In one embodiment, the system may be arranged to permit customers to obtain multiple passes at some times and not at others. For example, if the wait time for accessing one or two attractions is particularly long (whether by the first or second queue 24,26) the system may be arranged to permit customers to obtain passes for different attractions so that the customer avoids the need to access one attraction before obtaining a pass for accessing another attraction.

Advantageously, the method and system of the present invention permits one or more customers to gain access to an attraction without having to wait in a standard line to access the attraction. This permits the customer to engage in other activities instead of waiting in line. Such activities may comprise shopping or eating.

In one or more embodiments, the method and system advantageously permits "real-time" adjustment of the flow of customers to the attraction 22 via the first and second queues. This is advantageous since it permits optimization of the capacity of the attraction with the demand of customers. In the event the line of customers in the first queue 24 becomes excessively long, the system can provide for an adjustment in the number of customers permitted to access the attraction 22 via the second queue 26 and thus reduce the wait time associated with the first queue. In addition, in the event the capacity of the attraction 22 suddenly decreases, the system can provide for an adjustment in the number of customers and/or access times via the second queue 26 to prevent a build up of customers accessing the attraction 22 via the first and/or second queues. In the event the capacity of the attraction 22 increases, the system can provide for an additional number of customers to access the attraction 22 via the second queue 26 and/or adjust the access times to permit more customers to access the attraction.

A media distributor distributes an admission media to customers entitled to access the attraction, said admission media including informational material printed thereon. The informational material is correlated to the location of the media distributor and the time assigned. Further, the informational material is generated specifically for the customer based upon an identification of that customer. Also, the informational material is generated to influence pedestrian traffic patterns.

Referring to FIG. 14, a sample pass 300 as generated by media distributor 32 is illustrated. Pass 300 contains various sections of text that can be varied from pass to pass and is selected by the system or system operator. An attraction identification 310 is provided to identify the particular ride or attraction that the patron has access too. A time section 320 identifies the particular time or time range that the patron can access the attraction without having to wait in the physical line or queue. As previously explained, the actual time or time range assigned to a given patron will be generated by the system based on various conditions. A promotional or advertising section 320 is provided and can include various messages that are generated by the system. The date 325 pass 300 was issued, along with the time 330 it was issued can also be printed. The arrangement, sizing, and presentation of the textual material can all be varied as desired. Though not separately shown, various elements can be provided on pass 300 to allow for authentication and validation.

The textual material included in advertising section 320 can either be static or dynamically generated. That is, the particular message(s) chosen to be printed could be the same on each pass printed. This would simply serve as advertising or promotional material for certain preselected beneficiaries. Alternatively, targeted promotional material can by dynamically generated and printed on one or more passes. That is, each pass 300 or a grouping of such passes (i.e., those having the same times for entry) could have different material printed within advertising section 320.

The ability to print targeted material on various printed passes 300 allows for a number of advantages. By offering patrons certain incentives to perform certain activities, pedestrian traffic patterns can be influenced and to some extent controlled. Thus, pedestrian traffic can be directed away from certain areas during times when crowding is severe. For example, if a major tour or attraction ends at 3:00 p.m. and introduces a large number of people into a particular location, the system will want to cause others to avoid that area around that time. Thus, the printed passes 300 for various relevant attractions could advertise an enjoyable event or offer a reduced price meal or other premium for the patron at a location remote from the congestion. Likewise, pedestrian traffic can be directed towards predetermined areas featuring certain events, attractions, or establishments. Thus, the system allows for the self promotion of areas deemed desirable for various reasons by the park management.

By coordinating the printed material with the generated waiting times, park efficiency is increased. Patrons can be encouraged to follow predetermined paths that allow for a more even distribution of pedestrian traffic among the various shops, restaurants and attractions of the park. Thus, the park benefits through increased efficiency and the patrons benefit by being less affected by crowding.

The material printed and the effects desired to be achieved can either be selected by the system or entered by park officials at any time. Thus, cyclic and predictable events can be accounted for automatically. Certain events that may occur more infrequently could still be accounted for by the automated system. For example, if a major attraction goes off line, this information can automatically be gathered and passed along to the various controllers operating within the system. Thus, the targeted advertising could be used to simply inform patrons of the attraction closure or to guide them to other areas of the park. Finally, information could be manually entered to cause specific material to be printed on certain passes 300.

The material printed within advertising section 320 can vary depending upon the desired result. Coupons, discounts, and other promotions can be given for any number of patron activities. Specific events, attractions, restaurants, stores, or merchandise can be promoted. This can be done to alert patrons to new attractions or events that they may not have heard about. Alternatively, this could be used to promote events that have received less participation than expected. Finally, events which are known to be popular but often overlooked by busy patrons can be advertised simply as a helpful reminder to the patron. For example, parade times and locations can vary. Thus, a generated pass 300 might remind that patron of a parade occurring soon in a nearby location.

Many of these benefits are achieved by integrating the time and/or location of the generated pass 300 with the selected targeted advertising information 320. That is, by knowing where the attraction is located with respect to the other attractions and locations in the park, the status of those various attractions/events, the current time, the time window during which the patron will be assigned, and the normal abilities for movement of a patron, the system can determine what promotional material is most beneficial to print. Ultimately, the system is capable of printing any desired message on any given pass 300.

The textual messaging printed or otherwise provided within section 320 is not limited to advertising or promotional material. Ultimately, any information may be provided for any number of purposes on single or multiple passes 300. For example, park management could print messages about a lost child, other welfare concerns, or items of general interest.

In various embodiments of the present invention, the patron is provided with an item that uniquely identifies that patron to the system. For example, upon admission to the park the patron may be granted an admission ticket having a magnetic strip coded with identifying information. At various points throughout their visit, that admission ticket may be utilized for certain functions and at the same time, alert the particular system of the park to the identity of the patron.

Thus, it may be desirable to either allow for or require a patron to present such an identifying media when obtaining pass 300 for admission to a given event or attraction. As previously discussed, this provides one way of validating that the patron is entitled to such a pass at a given time. In addition, this provides identifying information about the patron to the system. Thus, messages specifically directed to this patron can be printed on pass 300 in section 320. For example, a given patron could receive a message to meet another patron at a specific time or place or to telephone another individual. This allows various remotely located parties to contact one another. Of course, there are various reasons why park management may wish to provide a specific message to a patron. For example, a message could be generated for a patron indicating that his wallet had been found and is now located at a particular security station. Furthermore, targeted messages could be directed to the members for various groups visiting the park together. As one example, members of a high school class could be spending the day in such an amusement park. When a member of that class requests pass 300, relevant messages could be printed such as where or when to meet the group. Of course, knowing who the patron is and if they belong to a specific group may also allow for customized advertising to be generated.

Targeted, patron (or group) specific messages can be printed on pass 300. All that is required is providing a way of identifying the patron to the system as pass 300 is requested. There are many way of accomplishing this within the scope of the present invention. As discussed, admission media could be provided when entering the park. Any number of other identifying products could be provided throughout the park. In addition, a patron can be asked to manually enter or otherwise provide identification information at the point pass 300 is obtained.

Pass 300, as described, can be printed with any number of and types of messages. Advertising, promotional, patron or group specific messages can be generated in various combinations. Of course, any material may be printed, whether categorized or not. Thus, "informational material", as used herein is meant to include any material that may be printed or otherwise added to pass 300, whether for purposes of advertising, promotion, communication, traffic management, information dissemination, or otherwise.

Of course, the foregoing description is that of one or more embodiments of the invention, and various changes and modifications may be made without departing from the spirit and scope of the invention, as defined by the claims.

What is claimed is:

1. A system for managing admission to an attraction comprising:
    a first validator for establishing an entitlement of a customer to access the attraction;
    a controller for generating an assigned time at which said customer may access the attraction, said assigned time comprising a next available time as determined by an algorithm performed by said system;
    a distributor for distributing an admission pass to customers entitled to access the attraction, said admission pass including informational material; and wherein the informational material is generated specifically for at least one of the customer based upon an identification of that customer or to influence pedestrian traffic patterns; and
    a second validator for permitting said customer to access said attraction at said assigned time.

2. The system in accordance with claim 1 wherein the controller unilaterally determines and issues said assigned time to said customer.

3. A system for managing admission to an attraction comprising;
    a first queue by which customers may access the attraction by waiting in line;
    a second queue by which customers may access the attraction in a manner which avoids the first queue;
    a distributor for distributing an admission pass to customers entitled to access the attraction, said admission pass including informational material; and wherein the informational material is generated for at least one of specifically being for the customer based upon an identification of that customer or to influence pedestrian traffic patterns; and
    a first validator for validating an entitlement of a customer to access the second queue and generating an assigned time in the future at which an entitled customer may access the attraction via the second queue.

4. The system in accordance with claim 3, further comprising:
    a second validator for permitting the entitled customer access to the attraction at the assigned time.

5. The system in accordance with claim 4 wherein the assigned time is determined and selected by the system.

6. The system in accordance with claim 5, wherein only a single time is generated and assigned to any one customer at any one time.

7. The system in accordance with claim 3 including a display for displaying a time which is next to be assigned.

8. The system in accordance with claim 3 including a media distributor for distributing an admission media to customers entitled to access the attraction, said admission media including informational material printed thereon.

9. The system in accordance with claim 8 wherein said informational material is correlated to the location of the media distributor and the time assigned.

10. A system for managing admission to an attraction comprising:
    a first queue by which customers may access the attraction by waiting in line;
    a second queue by which customers may access the attraction in a manner which avoids the first queue;
    a first validator for validating an entitlement of a customer to access the second queue and generating an assigned time in the future at which an entitled customer may access the attraction via the second queue;
    a second validator for permitting the entitled customer access to the attraction at the assigned time;
    the assigned time being determined and selected by the system and wherein only a single time is generated and assigned to any one customer at any one time; and
    wherein said first validator is arranged to validate at least one type of identifying information from the group consisting of: magnetic strip, bar code, radio-frequency, iris, fingerprint, retina, voice, thermal, finger or hand geometry, and visual identification.

11. The system in accordance with claim 10 wherein said second validator is arranged to validate at least one type of identifying information from the group consisting of: magnetic strip, bar code, radio-frequency, iris, fingerprint, retina, voice, thermal, finger or hand geometry, and visual identification.

12. The system in accordance with claim 11 including at least one data storage device for storing data regarding times previously assigned to customers and wherein said system is arranged to deny validation of said customer to entitlement to an assigned time if said customer has an outstanding unused assigned time associated with said at least one storage device.

13. The system in accordance with claim 12 including a media distributor for distributing an admission media to customers entitled to access the attraction, said admission media including said assigned time.

14. The system in accordance with claim 13 wherein said media comprises a printed pass.

15. The system in accordance with claim 14 wherein said first validator comprises a card reader for reading a ticket belonging to a customer.

16. A system for managing admission to an attraction comprising:
    a first queue by which customers may access the attraction by waiting in line;
    a second queue by which customers may access the attraction in a manner which avoids the first queue;
    a first validator for validating an entitlement of a customer to access the second queue and generating an assigned time in the future at which an entitled customer may access the attraction via the second queue;
    a media distributor for distributing an admission media to customers entitled to access the attraction, said admission media including informational material printed thereon; and wherein the informational material is generated specifically for the customer based upon an identification of that customer.

17. A system for managing admission to an attraction comprising:
   a first queue by which customers may access the attraction by waiting in line;
   a second queue by which customers may access the attraction in a manner which avoids the first queue;
   a first validator for validating an entitlement of a customer to access the second queue and generating an assigned time in the future at which an entitled customer may access the attraction via the second queue;
   a media distributor for distributing an admission media to customers entitled to access the attraction, said admission media including informational material printed thereon; and
   wherein the informational material is generated to influence pedestrian traffic patterns.

18. A method for managing access of one or more customers to an attraction comprising:
   establishing at least one first queue by which one or more customers may access said attraction generally in an order in which customers access said at least one first queue;
   establishing at least one second queue by which one or more customers may access said attraction in a manner which avoids said at least one first queue;
   establishing entitlement of at least one customer and generating an assigned time in the future for each entitled customer for accessing said attraction via said at least one second queue;
   distributing an admission pass to customers entitled to access the attraction, said admission pass including informational material; and wherein the informational material is generated specifically for at least one of the customer based upon an identification of that customer or to influence pedestrian traffic patterns; and
   establishing entitlement of at least one customer to access said attraction via said at least one second queue at said assigned time in the future.

19. The method in accordance with claim 18 wherein said assigned time is determined and selected by a controller.

20. The method in accordance with claim 18 including the step of issuing a media to said at least one customer if entitlement to an assigned time in the future is established.

21. The method in accordance with claim 18 including the step of assigning said times in the future in chronological order.

22. The method in accordance with claim 18 including the step of displaying a next to be assigned time in the future for accessing said attraction via said at least one second queue.

23. The method in accordance with claim 18 wherein said assigned time is generated based upon one or more factors affecting demand for and capacity of said attraction.

24. The method in accordance with claim 18 including the step of providing a printed pass including informational material printed thereon.

25. The method in accordance with claim 24 wherein said informational material is correlated to the location where the printed pass was printed and the time assigned.

26. A method for managing access of one or more customers to an attraction comprising:
   establishing at least one first queue by which one or more customers may access said attraction generally in an order in which customers access said at least one first queue;
   establishing at least one second queue by which one or more customers may access said attraction in a manner which avoids said at least one first queue;
   establishing entitlement of at least one customer and generating an assigned time in the future for each entitled customer for accessing said attraction via said at least one second queue;
   establishing entitlement of at least one customer to access said attraction via said at least one second queue at said assigned time in the future;
   wherein informational material is correlated to the location where a printed pass was printed and the time assigned; and
   wherein the informational material is generated to influence pedestrian traffic patterns.

27. A method for managing access of one or more customers to an attraction comprising:
   establishing at least one first queue by which one or more customers may access said attraction generally in an order in which customers access said at least one first queue;
   establishing at least one second queue by which one or more customers may access said attraction in a manner which avoids said at least one first queue;
   establishing entitlement of at least one customer and generating an assigned time in the future for each entitled customer for accessing said attraction via said at least one second queue;
   establishing entitlement of at least one customer to access said attraction via said at least one second queue at said assigned time in the future;
   wherein informational material is correlated to the location where a printed pass was printed and the time assigned; and
   wherein the informational material is generated specifically for the customer based upon an identification of that customer.

28. A method of managing access to an attraction comprising:
   establishing at least one first queue by which one or more customers may access said attraction generally in an order in which customers access said at least one first queue;
   establishing at least one second queue by which one or more customers may access said attraction in a manner which avoids said at least one first queue;
   determining at one or more times a real time operating capacity of said attraction;
   generating an admission pass to customers entitled to access the attraction, said admission pass including informational material; and wherein the informational material is generated specifically for at least one of the customer based upon an identification of that customer or to influence pedestrian traffic patterns;
   issuing media to said customers, said media having an assigned time in the future associated therewith at which time said customer may access said attraction via said at least one second queue, said media having assigned times which are issued on a first come, first served basis; and
   permitting a customer having a media to access said attraction via said second queue at said assigned time in the future.

29. The method in accordance with claim 28 wherein said attraction is one of several at a venue and including the step of issuing said media having multiple assigned times in the future associated therewith, said times including a time at which said customer may access said attraction and a time at which said customer may access at least one other attraction of said venue.

30. The method in accordance with claim 28 wherein said attraction is associated with a venue and wherein said media is issued prior to said customer accessing said venue.

31. A method of managing access to an attraction comprising:
    establishing at least one first queue by which one or more customers may access said attraction generally in an order in which customers access said at least one first queue;
    establishing at least one second queue by which one or more customers may access said attraction in a manner which avoids said at least one first queue;
    issuing media to said customers, said media having an assigned time in the future associated therewith at which time said customer may access said attraction via said at least one second queue, said media having assigned times which are issued on a first come, first served basis;
    permitting a customer having a media to access said attraction via said second queue at said assigned time in the future; and
    wherein said assigned time must be the next available time.

32. The method in accordance with claim 31 including the step of verifying entitlement of said customer to be issued said media.

33. The method in accordance with claim 31 including the step of comparing a current time to said assigned time in the future associated with said media for determining if said customer is permitted to access said attraction via said second queue.

34. The method in accordance with claim 31 wherein said media comprises a printed pass.

35. The method in accordance with claim 31 including the step of generating said assigned times based upon a demand for and capacity of said attraction.

36. The method in accordance with claim 31 including the step of generating said assigned times based upon a number of spots associated with said attraction allocated to customers accessing said attraction via said second queue in relation to a total number of spots associated with said attraction.

37. The method in accordance with claim 31 wherein said attraction is associated with a venue and including the steps of verifying entitlement of said customer to access said venue and issuing said media at said time said customer accesses said venue.

38. A method of managing access to an attraction comprising:
    establishing at least one first queue by which one or more customers may access said attraction generally in an order in which customers access said at least one first queue;
    establishing at least one second queue by which one or more customers may access said attraction in a manner which avoids said at least one first queue;
    determining at one or more times a real time operating capacity of said attraction;
    generating an admission pass to customers entitled to access the attraction, said admission pass including informational material; and wherein the informational material is generated specifically for at least one of the customer based upon an identification of that customer or to influence pedestrian traffic patterns;
    issuing media to said customers, said media having an assigned time in the future associated therewith at which time said customer may access said attraction via said at least one second queue, said media having assigned times wherein said assigned times are based on a determination of a next available time; and
    permitting a customer having a media to access said attraction via said second queue at said assigned time in the future.

39. The method in accordance with claim 38 wherein said attraction is one of several at a venue and including the step of issuing said media having multiple assigned times in the future associated therewith, said times including a time at which said customer may access said attraction and a time at which said customer may access at least one other attraction of said venue.

40. The method in accordance with claim 38 wherein said attraction is associated with a venue and wherein said media is issued prior to said customer accessing said venue.

41. A method of managing access to an attraction comprising:
    establishing at least one first queue by which one or more customers may access said attraction generally in an order in which customers access said at least one first queue;
    establishing at least one second queue by which one or more customers may access said attraction in a manner which avoids said at least one first queue;
    issuing media to said customers, said media having an assigned time in the future associated therewith at which time said customer may access said attraction via said at least one second queue, said media having assigned times wherein said assigned times are based on a determination of a next available time;
    permitting a customer having a media to access said attraction via said second queue at said assigned time in the future; and
    wherein said assigned time must be the next available time.

42. The method in accordance with claim 41 including the step of verifying entitlement of said customer to be issued said media.

43. The method in accordance with claim 41 including the step of comparing a current time to said assigned time in the future associated with said media for determining if said customer is permitted to access said attraction via said second queue.

44. The method in accordance with claim 41 wherein said media comprises a printed pass.

45. The method in accordance with claim 41 including the step of generating said assigned times based upon a demand for and capacity of said attraction.

46. The method in accordance with claim 41 including the step of generating said assigned times based upon a number of spots associated with said attraction allocated to customers accessing said attraction via said second queue in relation to a total number of spots associated with said attraction.

47. The method in accordance with claim 41 wherein said attraction is associated with a venue and including the steps of verifying entitlement of said customer to access said venue and issuing said media at said time said customer accesses said venue.

48. A method of managing access to an attraction comprising:
  establishing at least one first queue by which one or more customers may access said attraction generally in an order in which customers access said at least one first queue;
  establishing at least one second queue by which one or more customers may access said attraction in a manner which avoids said at least one first queue;
  determining at one or more times a real time operating capacity of said attraction;
  generating an admission pass to customers entitled to access the attraction, said admission pass including informational material; and wherein the informational material is generated specifically for at least one of the customer based upon an identification of that customer or to influence pedestrian traffic patterns;
  issuing media to said customers, said media having an assigned time in the future associated therewith at which time said customer may access said attraction via said at least one second queue, said media having assigned times wherein said assigned times are based on a determination of a next available time, as determined at the time of issuance; and
  permitting a customer having a media to access said attraction via said second queue at said assigned time in the future.

49. The method in accordance with claim 48 wherein said attraction is one of several at a venue and including the step of issuing said media having multiple assigned times in the future associated therewith, said times including a time at which said customer may access said attraction and a time at which said customer may access at least one other attraction of said venue.

50. The method in accordance with claim 48 wherein said attraction is associated with a venue and wherein said media is issued prior to said customer accessing said venue.

51. A method of managing access to an attraction comprising:
  establishing at least one first queue by which one or more customers may access said attraction generally in an order in which customers access said at least one first queue;
  establishing at least one second queue by which one or more customers may access said attraction in a manner which avoids said at least one first queue;
  issuing media to said customers, said media having an assigned time in the future associated therewith at which time said customer may access said attraction via said at least one second queue, said media having assigned times wherein said assigned times are based on a determination of a next available time, as determined at the time of issuance;
  permitting a customer having a media to access said attraction via said second queue at said assigned time in the future; and
  wherein the assigned time must be the next available time.

52. The method in accordance with claim 51 including the step of verifying entitlement of said customer to be issued said media.

53. The method in accordance with claim 51 including the step of comparing a current time to said assigned time in the future associated with said media for determining if said customer is permitted to access said attraction via said second queue.

54. The method in accordance with claim 51 wherein said media comprises a printed pass.

55. The method in accordance with claim 51 including the step of generating said assigned times based upon a demand for and capacity of said attraction.

56. The method in accordance with claim 51 including the step of generating said assigned times based upon a number of spots associated with said attraction allocated to customers accessing said attraction via said second queue in relation to a total number of spots associated with said attraction.

57. The method in accordance with claim 51 wherein said attraction is associated with a venue and including the steps of verifying entitlement of said customer to access said venue and issuing said media at said time said customer accesses said venue.

58. A method of managing access to an attraction comprising:
  establishing at least one first queue by which one or more customers may access said attraction generally in an order in which customers access said at least one first queue;
  establishing at least one second queue by which one or more customers may access said attraction in a manner which avoids said at least one first queue;
  determining at one or more times a real time operating capacity of said attraction;
  generating an admission pass to customers entitled to access the attraction, said admission pass including informational material; and wherein the informational material is generated specifically for at least one of the customer based upon an identification of that customer or to influence pedestrian traffic patterns;
  calculating a next available time to access said attraction through said second queue;
  offering an assigned time to said customer, wherein said assigned time is determined based upon said calculation of said next available time;
  issuing media to said customers, said media having the assigned time associated therewith at which time said customer may access said attraction via said at least one second queue; and
  permitting a customer having a media to access said attraction via said second queue at said assigned time in the future.

59. The method in accordance with claim 58 wherein said attraction is one of several at a venue and including the step of issuing said media having multiple assigned times in the future associated therewith, said times including a time at which said customer may access said attraction and a time at which said customer may access at least one other attraction of said venue.

60. The method in accordance with claim 58 wherein said attraction is associated with a venue and wherein said media is issued prior to said customer accessing said venue.

61. A method of managing access to an attraction comprising:
  establishing at least one first queue by which one or more customers may access said attraction generally in an order in which customers access said at least one first queue;
  establishing at least one second queue by which one or more customers may access said attraction in a manner which avoids said at least one first queue;
  calculating a next available time to access said attraction through said second queue;

offering an assigned time to said customer, wherein said assigned time is determined based upon said calculation of said next available time;

issuing media to said customers, said media having the assigned time associated therewith at which time said customer may access said attraction via said at least one second queue;

permitting a customer having a media to access said attraction via said second queue at said assigned time in the future; and wherein said assigned time must be the next available time.

62. The method in accordance with claim 61 including the step of verifying entitlement of said customer to be issued said media.

63. The method in accordance with claim 61 including the step of comparing a current time to said assigned time in the future associated with said media for determining if said customer is permitted to access said attraction via said second queue.

64. The method in accordance with claim 61 wherein said media comprises a printed pass.

65. The method in accordance with claim 61 including the step of generating said assigned times based upon a demand for and capacity of said attraction.

66. The method in accordance with claim 61 including the step of generating said assigned times based upon a number of spots associated with said attraction allocated to customers accessing said attraction via said second queue in relation to a total number of spots associated with said attraction.

67. The method in accordance with claim 61 wherein said attraction is associated with a venue and including the steps of verifying entitlement of said customer to access said venue and issuing said media at said time said customer accesses said venue.

68. A method of managing access to an attraction comprising:

establishing at least one first queue by which one or more customers may access said attraction generally in an order in which customers access said at least one first queue;

establishing at least one second queue by which one or more customers may access said attraction in a manner which avoids said at least one first queue;

determining at one or more times a real time operating capacity of said attraction;

generating an admission pass to customers entitled to access the attraction, said admission pass including informational material; and wherein the informational material is generated specifically for at least one of the customer based upon an identification of that customer or to influence pedestrian traffic patterns;

determining and selecting a time to be assigned; offering said assigned time to said customer;

issuing media to said customers when said customer requests said assigned time, said media having the assigned time associated therewith at which time said customer may access said attraction via said at least one second queue; and permitting a customer having a media to access said attraction via said second queue at said assigned time.

69. The method in accordance with claim 68 including the step of verifying entitlement of said customer to be issued said media.

70. The method in accordance with claim 68 including the step of comparing a current time to said assigned time in the future associated with said media for determining if said customer is permitted to access said attraction via said second queue.

71. The method in accordance with claim 68 wherein said media comprises a printed pass.

72. The method in accordance with claim 68 including the step of generating said assigned times based upon a demand for and capacity of said attraction.

73. The method in accordance with claim 68 including the step of generating said assigned times based upon a number of spots associated with said attraction allocated to customers accessing said attraction via said second queue in relation to a total number of spots associated with said attraction.

74. The method in accordance with claim 68 wherein said attraction is associated with a venue and including the steps of verifying entitlement of said customer to access said venue and issuing said media at said time said customer accesses said venue.

75. The method in accordance with claim 68 wherein said attraction is one of several at a venue and including the step of issuing said media having multiple assigned times in the future associated therewith, said times including a time at which said customer may access said attraction and a time at which said customer may access at least one other attraction of said venue.

76. The method in accordance with claim 68 wherein said attraction is associated with a venue and wherein said media is issued prior to said customer accessing said venue.

77. A system for managing admission to an attraction comprising:

a first validator for establishing the entitlement of a customer to access the attraction;

a controller for determining a next available time as determined and selected by an algorithm performed by said system, and generating an assigned time based upon said determined next available time;

a distributor for distributing an admission pass to customers entitled to access the attraction, said admission pass including informational material; and wherein the informational material is generated specifically for at least one of the customer based upon an identification of that customer or to influence pedestrian traffic patterns; and a second validator for permitting said customer to access said attraction at said assigned time.

78. The system of claim 77 wherein said assigned time comprises a time range during which the customer may access the attraction.

79. The system in accordance with claim 77 wherein said first validator for establishing the entitlement comprises a card reader for reading a ticket belonging to a customer.

80. The system in accordance with claim 77 including an algorithm processor for determining at one or more times a real time operating capacity of said attraction, said algorithm processor determining a mix ratio of first queue patrons and second queue patrons and providing data about said real time operating capacity and said mix ratio to said controller for generating said assigned time.

81. The system in accordance with claim 77 wherein the attraction comprises a theme park ride.

82. The system in accordance with claim 81 including sensors associated with said attraction providing data regarding a capacity of said attraction to said controller for generating an assigned time.

83. The system in accordance with claim 77 including a first queue by which customers access said attraction and a second queue by which said customers access said attraction and wherein first validator establishes the entitlement of a customer to access the attraction via the second queue and said second validator is associated with said second queue.

84. A system for managing admission to an attraction comprising:
- a first validator for establishing the entitlement of a customer to access the attraction;
- a controller for determining a next available time as determined and selected by an algorithm performed by said system, and generating an assigned time based upon said determined next available time;
- a second validator for permitting said customer to access said attraction at said assigned time; and
- wherein said assigned time must be the next available time.

85. The system in accordance with claim 84 including a media distributor for distributing an admission media to customers entitled to access the attraction, said admission media including said assigned time.

86. The system in accordance with claim 85 wherein said admission media is utilized with said second validator to establish entitlement of the customer to access said attraction.

87. The system in accordance with claim 86 wherein said admission media comprises a printed pass.

88. A system for managing admission to an attraction comprising:
- a first validator for establishing the entitlement of a customer to access the attraction;
- a controller configured to determine and select an assigned time based upon an algorithm performed by said system and to allow said assigned time to be offered to said customer;
- a processor for determining at one or more times a real time operating capacity of said attraction;
- a distributor for distributing an admission pass to customers entitled to access the attraction, said admission pass including informational material; and wherein the informational material is generated specifically for at least one of the customer based upon an identification of that customer or to influence pedestrian traffic patterns; and
- a second validator for permitting said customer to access said attraction at said assigned time, when said assigned time is taken by said customer.

89. The system of claim 88 wherein said assigned time comprises a time range during which the customer may access the attraction.

90. The system in accordance with claim 88 including a media distributor for distributing an admission media to customers entitled to access the attraction, said admission media including said assigned time.

91. The system in accordance with claim 90 wherein said admission media is utilized with said second validator to establish entitlement of the customer to access said attraction.

92. The system in accordance with claim 91 wherein said admission media comprises a printed pass.

93. The system in accordance with claim 88 wherein said first validator for establishing the entitlement comprises a card reader for reading a ticket belonging to a customer.

94. The system in accordance with claim 88 including an algorithm processor for determining at one or more times a real time operating capacity of said attraction, said algorithm processor determining a mix ratio of first queue patrons and second queue patrons and providing data about said real time operating capacity and said mix ratio to said controller for generating said assigned time.

95. The system in accordance with claim 88 wherein the attraction comprises a theme park ride.

96. The system in accordance with claim 95 including sensors associated with said attraction providing data regarding a capacity of said attraction to said controller for generating an assigned time.

97. The system in accordance with claim 88 including a first queue by which customers access said attraction and a second queue by which said customers access said attraction and wherein first validator establishes the entitlement of a customer to access the attraction via the second queue and said second validator is associated with said second queue.

98. A system for managing admission to an attraction comprising:
- a first validator for establishing the entitlement of a customer to access the attraction;
- a controller for determining a next available time as determined and selected by an algorithm performed by said system, generating an assigned time based upon said determined next available time, and offering said assigned time to said customer;
- a distributor for distributing an admission pass to customers entitled to access the attraction, said admission pass including informational material; and wherein the informational material is generated specifically for at least one of the customer based upon an identification of that customer or to influence pedestrian traffic patterns; and
- a second validator for permitting said customer to access said attraction at said assigned time, when said assigned time is taken by said customer.

99. The system of claim 98 wherein said assigned time comprises a time range during which the customer may access the attraction.

100. The system in accordance with claim 98 including a media distributor for distributing an admission media to customers entitled to access the attraction, said admission media including said assigned time.

101. The system in accordance with claim 100 wherein said admission media is utilized with said second validator to establish entitlement of the customer to access said attraction.

102. The system in accordance with claim 101 wherein said admission media comprises a printed pass.

103. The system in accordance with claim 98 wherein said first validator for establishing the entitlement comprises a card reader for reading a ticket belonging to a customer.

104. The system in accordance with claim 98 including an algorithm processor for determining at one or more times a real time operating capacity of said attraction, said algorithm processor determining a mix ratio of first queue patrons and second queue patrons and providing data about said real time operating capacity and said mix ratio to said controller for generating said assigned time.

105. The system in accordance with claim 98 wherein the attraction comprises a theme park ride.

106. The system in accordance with claim 105 including sensors associated with said attraction providing data regarding a capacity of said attraction to said controller for generating an assigned time.

107. The system in accordance with claim 98 including a first queue by which customers access said attraction and a second queue by which said customers access said attraction and wherein first validator establishes the entitlement of a customer to access the attraction via the second queue and said second validator is associated with said second queue.

108. A system for managing admission to an attraction comprising:
   a first queue by which customers may access the attraction by waiting in line;
   a second queue by which customers may access the attraction in a manner which avoids the first queue;
   a distributor for distributing an admission pass to customers entitled to access the attraction, said admission pass including informational material; and wherein the informational material is generated specifically for at least one of the customer based upon an identification of that customer or to influence pedestrian traffic patterns;
   a first validator for validating an entitlement of a customer to access the attraction at an assigned time in the future via the second queue, wherein the assigned time is determined by the system, based on a determination of a next available time; and
   a second validator for validating the entitled customer access to the attraction at the assigned time.

109. A system for managing admission to an attraction comprising:
   a first queue by which customers may access the attraction by waiting in line;
   a second queue by which customers may access the attraction in a manner which avoids the first queue;
   a first validator for validating an entitlement of a customer to access the attraction at an assigned time in the future via the second queue, wherein the assigned time is determined by the system, based on a determination of a next available time;
   a second validator for validating the entitled customer access to the attraction at the assigned time; and
   wherein said assigned time must be the next available time.

110. The system in accordance with claim 109 including a media distributor for distributing a media to an entitled customer, said media including said assigned time at which the entitled customer is entitled to access the attraction in the future via said second queue.

111. The system in accordance with claim 110 wherein said media comprises a printed pass.

112. The system in accordance with claim 109 wherein said first validator comprises a card reader for reading a ticket.

113. The system in accordance with claim 109 wherein said system includes a controller for receiving data regarding a real time operating capacity of said attraction and providing times to be assigned by said media distributor in accordance with a mixed ratio of first queue patrons and second queue patrons.

114. The system in accordance with claim 113 wherein said controller includes a server.

115. The system in accordance with claim 109 including a database containing information regarding customers entitled to access said second queue.

116. The system in accordance with claim 115 wherein said database contains information regarding tickets belonging to customers.

117. The system in accordance with claim 109 including a display for displaying a wait time associated with said first queue.

118. The system in accordance with claim 109 including a display for displaying a time which is next to be assigned.

119. The system of claim 109 wherein said assigned time comprises a time range during which the customer may access the attraction.

120. A system for managing admission to an attraction comprising:
   a first queue by which customers may access the attraction by waiting in line;
   a second queue by which customers may access the attraction in a manner which avoids the first queue;
   a distributor for distributing an admission pass to customers entitled to access the attraction, said admission pass including informational material; and wherein the informational material is generated for at least one of specifically being for the customer based upon an identification of that customer or to influence pedestrian traffic patterns;
   a first validator for validating an entitlement of a customer to access the attraction at an assigned time in the future via the second queue, wherein the assigned time is determined by the system, based on a determination of a next available time, and offered to the customer; and
   a second validator for validating the entitled customer access to the attraction at the assigned time.

121. A system for managing admission to an attraction comprising:
   a first queue by which customers may access the attraction by waiting in line;
   a second queue by which customers may access the attraction in a manner which avoids the first queue;
   a first validator for validating an entitlement of a customer to access the attraction at an assigned time in the future via the second queue, wherein the assigned time is determined by the system, based on a determination of a next available time, and offered to the customer;
   a second validator for validating the entitled customer access to the attraction at the assigned time; and
   wherein said assigned time must be the next available time.

122. The system in accordance with claim 121 including a media distributor for distributing a media to an entitled customer, said media including said assigned time at which the entitled customer is entitled to access the attraction in the future via said second queue.

123. The system in accordance with claim 122 wherein said media comprises a printed pass.

124. The system in accordance with claim 121 wherein said first validator comprises a card reader for reading a ticket.

125. The system in accordance with claim 121 wherein said system includes a controller for receiving data regarding a real time operating capacity of said attraction and providing times to be assigned by said media distributor in accordance with a mixed ratio of first queue patrons and second queue patrons.

126. The system in accordance with claim 125 wherein said controller includes a server.

127. The system in accordance with claim 121 including a database containing information regarding customers entitled to access said second queue.

128. The system in accordance with claim 127 wherein said database contains information regarding tickets belonging to customers.

129. The system in accordance with claim 121 including a display for displaying a wait time associated with said first queue.

130. The system in accordance with claim 121 including a display for displaying a time which is next to be assigned.

131. The system of claim 121 wherein said assigned time comprises a time range during which the customer may access the attraction.

132. A system for managing admission to an attraction comprising:
   a first queue by which customers may access the attraction by waiting in line;
   a second queue by which customers may access the attraction in a manner which avoids the first queue;
   a distributor for distributing an admission pass to customers entitled to access the attraction, said admission pass including informational material; and wherein the informational material is generated for at least one of specifically being for the customer based upon an identification of that customer or to influence pedestrian traffic patterns;
   a first validator for validating an entitlement of a customer to access the attraction at an assigned time in the future via the second queue, wherein the assigned time is determined and selected by the system and offered to the customer; and
   a second validator for validating the entitled customer access to the attraction at the assigned time.

133. The system of claim 132 wherein said assigned time comprises a time range during which the customer may access the attraction.

134. A system for managing admission to an attraction comprising:
   a first queue by which customers may access the attraction by waiting in line;
   a second queue by which customers may access the attraction in a manner which avoids the first queue;
   a first validator for validating an entitlement of a customer to access the attraction at an assigned time in the future via the second queue, wherein the assigned time is determined and selected by the system and offered to the customer;
   a second validator for validating the entitled customer access to the attraction at the assigned time; and
   wherein said assigned time must be the next available time.

135. The system in accordance with claim 134 including a media distributor for distributing a media to an entitled customer, said media including said assigned time at which the entitled customer is entitled to access the attraction in the future via said second queue.

136. The system in accordance with claim 135 wherein said media comprises a printed pass.

137. The system in accordance with claim 134 wherein said first validator comprises a card reader for reading a ticket.

138. The system in accordance with claim 134 wherein said system includes a controller for receiving data regarding a real time operating capacity of said attraction and providing times to be assigned by said media distributor in accordance with a mixed ratio of first queue patrons and second queue patrons.

139. The system in accordance with claim 138 wherein said controller includes a server.

140. The system in accordance with claim 134 including a database containing information regarding customers entitled to access said second queue.

141. The system in accordance with claim 140 wherein said database contains information regarding tickets belonging to customers.

142. The system in accordance with claim 134 including a display for displaying a wait time associated with said first queue.

143. The system in accordance with claim 134 including a display for displaying a time which is next to be assigned.

144. A method of managing access to an attraction comprising:
   establishing at least one first queue by which one or more customers may access said attraction generally in an order in which customers access said at least one first queue;
   establishing at least one second queue by which one or more customers may access said attraction in a manner which avoids said at least one first queue;
   permitting a customer to elect to access said attraction via said at least one first queue or said at least one second queue;
   determining a next available time for accessing the attraction through said second queue, wherein a time to be assigned is derived from said determined next available time and said time to be assigned is offered to said customer;
   determining if said customer has any outstanding assigned future times; and
   offering said assigned time to said customer, if said customer has no outstanding assigned future times.

145. The method in accordance with claim 144 including the step of verifying said customer is entitled to be assigned said next available time if said customer elects to access said attraction via said at least one second queue.

146. The method in accordance with claim 144 wherein a subsystem determines and selects said time to be assigned based on a changing capacity of said attraction.

147. The method in accordance with claim 144 including the step of verifying said customer is entitled to access said attraction via said at least one second queue at said next available time.

148. The method in accordance with claim 144 including the step of allocating a number of spots associated with said attraction to customers accessing said attraction via said at least one second queue.

149. The system of claim 144 wherein said assigned time comprises a time range during which the customer may access the attraction.

150. A method of managing access to an attraction comprising:
   establishing at least one first queue by which one or more customers may access said attraction generally in an order in which customers access said at least one first queue;
   establishing at least one second queue by which one or more customers may access said attraction in a manner which avoids said at least one first queue;
   permitting a customer to elect to access said attraction via said at least one first queue or said at least one second queue;
   determining and selecting a future time to be assigned for accessing the attraction through said second queue;
   determining if said customer has any outstanding assigned future times; and
   offering said assigned time to said customer if said customer has no outstanding assigned future times.

151. The method in accordance with claim 150 including the step of verifying said customer is entitled to be assigned said future time if said customer elects to access said attraction via said at least one second queue.

152. The method in accordance with claim 150 wherein a subsystem determines and selects said time to be assigned based on a changing capacity of said attraction.

153. The method in accordance with claim 150 including the step of verifying said customer is entitled to access said attraction via said at least one second queue at said future time.

154. The method in accordance with claim 150 including the step of allocating a number of spots associated with said attraction to customers accessing said attraction via said at least one second queue.

155. The system of claim 150 wherein said assigned time comprises a time range during which the customer may access the attraction.

156. A method of managing access to an attraction comprising:
  establishing at least one first queue by which one or more customers may access said attraction generally in an order in which customers access said at least one first queue;
  establishing a least one second queue by which one or more customers may access said attraction in a manner which avoids said at said at least one first queue;
  determining and selecting a next available time to access said attraction via said second queue;
  offering an assigned time to said customer, wherein said assigned time is derived from said next available time;
  distributing media to customers entitled to access the attraction, said media including informational material; and wherein the informational material is generated specifically for at least one of the customer based upon an identification of that customer or to influence pedestrian traffic patterns;
  issuing media to said customers, said media having said assigned time associated therewith at which time said customer may access said attraction via said at least one second queue; and
  permitting a customer having a media to access said attraction via said second queue at said assigned time in the future.

157. The method in accordance with claim 156 including the step of determining if said customer is entitled to be issued said media.

158. The method in accordance with claim 156 including the step of comparing a current time to said assigned time in the future associated with said media for determining if said customer is permitted to access said attraction via said second queue.

159. The method in accordance with claim 156 wherein said media comprises a printed pass.

160. The method in accordance with claim 156 wherein said subsystem determines and selects said assigned times based upon a demand for and capacity of said attraction.

161. The method in accordance with claim 156 wherein said subsystem determines and selects said assigned times based upon a number of spots associated with said attraction allocated to customers accessing said attraction via said second queue in relation to a total number of spots associated with said attraction.

162. The method in accordance with claim 156 wherein said attraction is associated with a venue and including the steps of verifying entitlement of said customer to access said venue and issuing said media at said time said customer accesses said venue.

163. The method in accordance with claim 156 wherein said attraction is one of several at a venue and including the step of issuing said media having multiple assigned times in the future associated therewith, said times including a time at which said customer may access said attraction and a time at which said customer may access at least one other attraction of said venue.

164. The method in accordance with claim 156 wherein said attraction is associated with a venue and wherein said media is issued prior to said customer accessing said venue.

165. The system of claim 156 wherein said assigned time comprises a time range during which the customer may access the attraction.

166. A system for managing admission to an attraction comprising:
  a first validator for establishing the entitlement of a customer to access the attraction;
  a controller for determining a next available time as calculated by an algorithm performed by said system, and generating assigned times based upon said determined next available time;
  a distributor for distributing an admission pass to customers entitled to access the attraction, said admission pass including informational material; and wherein the informational material is generated for at least one of specifically being for the customer based upon an identification of that customer or to influence pedestrian traffic patterns; and
  a second validator for permitting said customer to access said attraction at an assigned time selected by the customer.

167. The system of claim 166 wherein said assigned time comprises a time range during which the customer may access the attraction.

168. The system in accordance with claim 166 including a media distributor for distributing an admission media to customers entitled to access the attraction, said admission media including said assigned time.

169. The system in accordance with claim 168 wherein said admission media is utilized with said second validator to establish entitlement of the customer to access said attraction.

170. The system in accordance with claim 169 wherein said admission media comprises a printed pass.

171. The system in accordance with claim 166 wherein said first validator for establishing the entitlement comprises a card reader for reading a ticket belonging to a customer.

172. The system in accordance with claim 166 including an algorithm processor for determining at one or more times a real time operating capacity of said attraction, said algorithm processor determining a mix ratio of first queue patrons and second queue patrons and providing data about said real time operating capacity and said mix ratio to said controller for generating said assigned times.

173. The system in accordance with claim 166 wherein the attraction comprises a theme park ride.

174. The system in accordance with claim 173 including sensors associated with said attraction providing data regarding a capacity of said attraction to said controller for generating said assigned times.

175. The system in accordance with claim 166 including a first queue by which customers access said attraction and a second queue by which said customers access said attraction and wherein first validator establishes the entitlement of a customer to access the attraction via the second queue and said second validator is associated with said second queue.

176. A system for managing admission to an attraction comprising:
  a first validator for establishing the entitlement of a customer to access the attraction;

a controller for determining a next available time as calculated by an algorithm performed by said system, and generating assigned times based upon said determined next available time;

a second validator for permitting said customer to access said attraction at an assigned time selected by the customer; and wherein said assigned time must be the next available time.

177. A system for managing admission to an attraction comprising:

a first queue by which customers may access the attraction by waiting in line;

a second queue by which customers may access the attraction in a manner which avoids the first queue;

a first validator for validating an entitlement of a customer to access the attraction at an assigned time in the future via the second queue, wherein assigned times are determined by the system, based on a determination of a next available time;

a distributor for distributing an admission pass to customers entitled to access the attraction, said admission pass including informational material; and wherein the informational material is generated for at least one of specifically being for the customer based upon an identification of that customer or to influence pedestrian traffic patterns; and a second validator for validating the entitled customer access to the attraction at the assigned time selected by the customer.

178. The system in accordance with claim 177 including a media distributor for distributing a media to an entitled customer, said media including said assigned time at which the entitled customer is entitled to access the attraction in the future via said second queue.

179. The system in accordance with claim 177 wherein said media comprises a printed pass.

180. The system in accordance with claim 177 wherein said first validator comprises a card reader for reading a ticket.

181. The system in accordance with claim 177 wherein said system includes a controller for receiving data regarding a real time operating capacity of said attraction and providing times to be assigned by said media distributor in accordance with a mixed ratio of first queue patrons and second queue patrons.

182. The system in accordance with claim 181 wherein said controller includes a server.

183. The system in accordance with claim 177 including a database containing information regarding customers entitled to access said second queue.

184. The system in accordance with claim 183 wherein said database contains information regarding tickets belonging to customers.

185. The system in accordance with claim 180 including a display for displaying a wait time associated with said first queue.

186. The system in accordance with claim 180 including a display for displaying a time which is next to be assigned.

187. The system of claim 180 wherein said assigned time comprises a time range during which the customer may access the attraction.

188. A system for managing admission to an attraction comprising:

a first queue by which customers may access the attraction by waiting in line;

a second queue by which customers may access the attraction in a manner which avoids the first queue;

a first validator for validating an entitlement of a customer to access the attraction at an assigned time in the future via the second queue, wherein assigned times are determined by the system, based on a determination of a next available time;

a second validator for validating the entitled customer access to the attraction at the assigned time selected by the customer; and wherein said assigned time must be the next available time.

189. A method of managing access to an attraction comprising:

establishing at least one first queue by which one or more customers may access said attraction generally in an order in which customers access said at least one first queue;

establishing a least one second queue by which one or more customers may access said attraction in a manner which avoids said at said at least one first queue;

determining if said customer is entitled to be issued said media;

determining a next available time to access said attraction via said second queue;

offering assigned times to said customers, wherein said assigned times are derived from said determination of a next available time;

issuing media to said customers, said media having an assigned time selected by the customer associated therewith at which time said customer may access said attraction via said at least one second queue;

permitting a customer having a media to access said attraction via said second queue at said assigned time in the future; and the issued media including informational material; and wherein the informational material is generated specifically for at least one of the customer based upon an identification of that customer or to influence pedestrian traffic patterns.

190. The method in accordance with claim 189 including the step of comparing a current time to said assigned time in the future associated with said media for determining if said customer is permitted to access said attraction via said second queue.

191. The method in accordance with claim 189 wherein said media comprises a printed pass.

192. The method in accordance with claim 189 wherein a subsystem determines and selects said assigned times based upon a demand for and capacity of said attraction.

193. The method in accordance with claim 189 wherein a subsystem determines and selects said assigned times based upon a number of spots associated with said attraction allocated to customers accessing said attraction via said second queue in relation to a total number of spots associated with said attraction.

194. The method in accordance with claim 189 wherein said attraction is associated with a venue and including the steps of verifying entitlement of said customer to access said venue and issuing said media at said time said customer accesses said venue.

195. The method in accordance with claim 189 wherein said attraction is one of several at a venue and including the step of issuing said media having multiple assigned times in the future associated therewith, said times including a time at which said customer may access said attraction and a time at which said customer may access at least one other attraction of said venue.

196. The method in accordance with claim 189 wherein said attraction is associated with a venue and wherein said media is issued prior to said customer accessing said venue.

197. The system of claim 189 wherein said assigned time comprises a time range during which the customer may access the attraction.

198. A system for the real time adjustment of the flow of customers to one or more particular attractions, thereby permitting optimization of the capacity of the attraction with the demand of customers comprising:

a first queue by which said customer may access said particular attraction by waiting in line;

a second queue by which said customer may access said particular attraction in a manner which avoids the first queue;

a distributor for distributing an admission pass to customers entitled to access the attraction, said admission pass including informational material; and wherein the informational material is generated specifically for at least one of the customer based upon an identification of that customer or to influence pedestrian traffic patterns;

a first validator for validating an entitlement of said customer to access the second queue;

a controller for unilaterally determining, generating and issuing an assigned range of time at which said customer may access said particular attraction via the second queue, wherein said controller comprises a processor for determining at one or more times, a real time operating capacity of said attraction, said processor providing data about said real time operating capacity to said system for generating said assigned range of time, a data storage device for storing data regarding times previously assigned to customers and wherein said system is arranged to permit or deny validation of said customer to entitlement to an assigned time based on said stored data; and a second validator for permitting the entitled customer access to assigned attraction at the assigned range of time.

199. A system according to claim 198 wherein said system is arranged to permit validation of said customer to entitlement to multiple assigned times.

200. A system according to claim 199 wherein said multiple assigned times are for the same attraction.

201. A system according to claim 199 wherein said multiple assigned times are each for different attractions.

202. A system according to claim 199 wherein said system permits validation to multiple assigned times at some times and not at others.

203. A system for managing admission to an attraction comprising;

a first queue by which customers may access the attraction by waiting in line;

a second queue by which customers may access the attraction in a manner which avoids the first queue;

a first validator for validating an entitlement of a customer to access the second queue and generating an assigned time in the future at which an entitled customer may access the attraction via the second queue;

a second validator for permitting the entitled customer access to the attraction at the assigned time;

the assigned time being determined and selected by the system; and wherein said first validator is arranged to validate at least one type of identifying information from the group consisting of: magnetic strip, bar code, radio-frequency, iris, fingerprint, retina, voice, thermal, finger or hand geometry, and visual identification.

204. The system in accordance with claim 203 wherein said second validator is arranged to validate at least one type of identifying information from the group consisting of: magnetic strip, bar code, radio-frequency, iris, fingerprint, retina, voice, thermal, finger or hand geometry, and visual identification.

205. A computer implemented method of managing access to an attraction in an area having multiple attractions in an entertainment park comprising:

establishing respective multiple first queues by which customers may access respective multiple attractions generally in an order effected by a sequence determined by the sequence of physically standing in the respective first queues;

establishing an access by which a customer may access respective attractions in a manner which avoids waiting in the physically formed respective first queues;

permitting a customer to elect to access said attraction via said respective first queues or by avoiding said respective first queues; and denying said customer access to an attraction by avoiding a respective first queue for the attraction if said customer has another outstanding assigned time for avoiding a respective first queue for an attraction.

206. A method of claim 205 wherein the denial is when such outstanding assigned time is related to another attraction in the entertainment park.

207. A method of claim 205 wherein the denial is when the outstanding assigned time is for a time earlier than the time the customer is seeking access to the attraction by avoiding the first queue.

208. A method of claim 205 wherein the denial is when the outstanding assigned time is for a time later than the time the customer is seeking access to the attraction by avoiding the first queue.

209. A computer implemented method of managing access to an attraction comprising:

establishing at least one first queue by which one or more customers may access said attraction generally in an order in which customers access said at least one first queue;

establishing an alternative access by which one or more customers may access said attraction in a manner which avoids said at least one first queue;

permitting a customer to elect to access said attraction via said at least one first queue or said alternative access;

determining and selecting a future time to be assigned for accessing the attraction through said alternative access;

determining if said customer has any outstanding assigned future times for alternative access; and offering said assigned time to said customer if said customer has no outstanding assigned future times.

210. A computer implemented method of managing access to an attraction comprising:

establishing at least one first queue by which one or more customers may access said attraction generally in an order in which customers access said at least one first queue;

establishing an alternative access by which one or more customers may access said attraction in a manner which avoids said at least one first queue;

permitting a customer to elect to access said attraction via said at least one first queue or said alternative access;

determining and selecting a future time to be assigned for accessing the attraction through said alternative access;

determining if said customer has any outstanding assigned future times for alternative access; and denying alternative access to said customer if said customer has an outstanding assigned future time.

211. A system for managing admission to an attraction comprising:

a first queue by which customers may access the attraction by waiting in line;

an alternative access by which customers may access the attraction in a manner which avoids the first queue;

a first validator for validating an entitlement of a customer to avoid the access the alternative access and generating an assigned time in the future at which an entitled customer may access the attraction via the alternative access;

a second validator for permitting the entitled customer access to the attraction at the assigned time;

the assigned time being determined and selected by the system and wherein a single time is generated and assigned to the customer; and wherein said second validator is arranged to validate at least one type of identifying information from the group consisting of: magnetic strip, bar code, radio-frequency, iris, fingerprint, retina, voice, thermal, finger or hand geometry, and visual identification.

212. The system in accordance with claim 211 including at least one data storage device for storing data regarding times previously assigned to customers and wherein said system is arranged to deny validation of said customer to entitlement to an assigned time if said customer has an outstanding unused assigned time associated with said at least one storage device.

* * * * *